US012578590B2

(12) United States Patent
Akimoto et al.

(10) Patent No.: US 12,578,590 B2
(45) Date of Patent: Mar. 17, 2026

(54) IMAGE DISPLAY DEVICE

(71) Applicant: NICHIA CORPORATION, Anan (JP)

(72) Inventors: Hajime Akimoto, Anan (JP); Takashi Sakamoto, Anan (JP); Masae Yamawaki, Anan (JP)

(73) Assignee: NICHIA CORPORATION, Anan (JP)

( * ) Notice: Subject to any disclaimer, the term of this patent is extended or adjusted under 35 U.S.C. 154(b) by 219 days.

(21) Appl. No.: 18/526,318

(22) Filed: Dec. 1, 2023

(65) Prior Publication Data

US 2024/0184129 A1     Jun. 6, 2024

(30) Foreign Application Priority Data

Dec. 5, 2022    (JP) ................................. 2022-194290
Dec. 20, 2022   (JP) ................................. 2022-203408

(51) Int. Cl.
G02B 30/10          (2020.01)
G02B 17/00          (2006.01)

(52) U.S. Cl.
CPC ........... G02B 30/10 (2020.01); G02B 17/006 (2013.01)

(58) Field of Classification Search
CPC ....... G02B 30/10; G02B 17/006; G02B 17/00
See application file for complete search history.

(56) References Cited

U.S. PATENT DOCUMENTS

| 11,892,572 B1 | 2/2024 | Dunphy et al. |
| 12,025,798 B1 | 7/2024 | Dehkordi et al. |

| 2010/0110384 A1 | 5/2010 | Maekawa |
| 2011/0074657 A1 | 3/2011 | Sugiyama |
| 2011/0235201 A1 | 9/2011 | Maekawa |
| 2018/0081058 A1 | 3/2018 | Kalscheur |
| 2018/0101087 A1 | 4/2018 | Shinohara |
| 2018/0164596 A1 | 6/2018 | Houzyou et al. |
| 2018/0203244 A1 | 7/2018 | Hatanaka et al. |
| 2018/0267216 A1 | 9/2018 | Otsubo |
| 2019/0179160 A1* | 6/2019 | Ito ...................... G02B 26/0816 |
| 2019/0196020 A1 | 6/2019 | Aceti et al. |
| 2020/0290513 A1 | 9/2020 | Karafin et al. |
| 2021/0103161 A1 | 4/2021 | Daiku |
| 2021/0379993 A1 | 12/2021 | Xu et al. |
| 2022/0043277 A1 | 2/2022 | Karafin et al. |

(Continued)

FOREIGN PATENT DOCUMENTS

| JP | 2009-042337 A | 2/2009 |
| JP | 2013-238681 A | 11/2013 |

(Continued)

OTHER PUBLICATIONS

U.S. Appl. No. 18/392,314, filed Dec. 21, 2023.

(Continued)

*Primary Examiner* — Balram T Parbadia
(74) *Attorney, Agent, or Firm* — Foley & Lardner LLP

(57) ABSTRACT

An image display device includes: an imaging element; a light source configured to irradiate light toward the imaging element; a light-shielding member configured to shield a portion of light of at least the light source; and a light-transmitting member configured to transmit light emitted from the imaging element, the light-transmitting member selectively controlling a transmission of light of at least some wavelengths of the light emitted from the imaging element.

26 Claims, 24 Drawing Sheets

(56)　　　　　　References Cited

U.S. PATENT DOCUMENTS

| 2022/0176869 | A1 | | 6/2022 | Maruyama | |
|---|---|---|---|---|---|
| 2023/0128022 | A1 | | 4/2023 | Weindorf et al. | |
| 2024/0125985 | A1 | * | 4/2024 | Akimoto | G02B 5/136 |
| 2024/0142799 | A1 | * | 5/2024 | Akimoto | G02B 30/56 |
| 2024/0184109 | A1 | | 6/2024 | Kitahara et al. | |
| 2024/0184132 | A1 | * | 6/2024 | Akimoto | H04N 13/327 |
| 2024/0210683 | A1 | | 6/2024 | Aruga et al. | |
| 2024/0210684 | A1 | | 6/2024 | Kitahara et al. | |
| 2024/0210725 | A1 | * | 6/2024 | Akimoto | G06F 3/013 |
| 2024/0253465 | A1 | | 8/2024 | Shintani et al. | |
| 2024/0329425 | A1 | * | 10/2024 | Akimoto | G02B 30/56 |
| 2024/0427169 | A1 | | 12/2024 | Daiku | |

FOREIGN PATENT DOCUMENTS

| JP | 2015-146009 | A | 8/2015 |
|---|---|---|---|
| JP | 2017-156466 | A | 9/2017 |
| JP | 2017-156467 | A | 9/2017 |
| JP | 2017-156468 | A | 9/2017 |
| WO | WO-2016/199902 | A1 | 12/2016 |
| WO | WO-2017/018204 | A1 | 2/2017 |
| WO | WO-2017/051598 | A1 | 3/2017 |
| WO | WO-2017/146172 | A1 | 8/2017 |

OTHER PUBLICATIONS

Non-Final Office Action in U.S. Appl. No. 18/390,715 dated May 30, 2025.
U.S. Appl. No. 18/390,715, filed Dec. 20, 2023.
U.S. Appl. No. 18/526,318, filed Dec. 1, 2023.
U.S. Appl. No. 18/741,019, filed Jun. 12, 2024.
Notice of Allowance on U.S. Appl. No. 18/520,041 dated Apr. 9, 2025.
U.S. Appl. No. 18/493,167, filed Oct. 24, 2023, Akimoto et al.
U.S. Appl. No. 18/504,237, filed Nov. 8, 2023, Akimoto et al.
U.S. Appl. No. 18/508,974, filed Nov. 14, 2023, Akimoto et al.
U.S. Appl. No. 18/520,041, filed Nov. 27, 2023, Akimoto et al.

* cited by examiner

IMAGE DISPLAY DEVICE

CROSS-REFERENCE TO RELATED APPLICATIONS

This application is based upon and claims priority to Japanese Patent Application No. 2022-194290, filed on Dec. 5, 2022, and Japanese Application No. 2022-203408, filed on Dec. 20, 2022. The entire contents of these applications are incorporated herein by reference.

FIELD

The present disclosure relates to a method for manufacturing an image display device.

A reflective imaging optical element that displays a real image of an object to be observed in mid-air and an image display device using the reflective imaging optical element have been proposed (see, e.g., Japanese Patent Publication No. 2015-146009).

Such an image display device can display an image when needed by a user, and not display the image at other times. Such an image display device does not require a device to be employed as a display part because the image is displayed in mid-air. Such an image display device therefore has advantages such as more effective utilization of the limited space inside an automobile or the like.

Further, a non-contact operation panel can be realized by applying such an image display device. Therefore, there are expectations for expanding the field of application beyond the utilization in automobiles and the like.

Reflective imaging optical elements that can display images in mid-air, such as those that use dihedral corner reflectors or retroreflective function optical elements called corner cube reflectors, have been put into practical use (see, e.g., PCT Publication No. WO2016/199902). Attention has been called to problems resulting from the operation principles of these devices. For example, in an image display device using imaging elements having dihedral corner reflectors, it is said to be difficult to avoid the display of virtual images at locations unintended by the user.

In an image display device using a corner cube reflector, the image formation position can be set relatively freely by using an optical element in addition to a light source and imaging element. On the other hand, the configuration of such an optical element is complex.

There is a demand for an image display device having a simple structure that can display an image in mid-air.

SUMMARY

According to certain embodiments of the invention, an image display device can be provided having a simple structure that can display an image in mid-air.

An image display device according to one embodiment of the invention includes an imaging element, a light source configured to irradiate light toward the imaging element, a light-shielding member configured to shield a portion of light of at least the light source, and a light-transmitting member that is arranged to transmit light emitted from the imaging element and selectively controls a transmission of light of at least some wavelengths of the light emitted from the imaging element. The imaging element includes a base member and a reflector array provided on the base member, the base member including a first surface and a second surface positioned at a side opposite to the first surface, or a base member including a reflector array, the base member including a first surface and a second surface positioned at a side opposite to the first surface, The reflector array includes a plurality of reflector rows, the plurality of reflector rows including a plurality of dihedral corner reflectors arranged along a first direction. Each of the plurality of dihedral corner reflectors includes a first reflecting surface configured to reflect light from the first surface side, and a second reflecting surface oriented to be orthogonal to the first reflecting surface and configured to reflect a reflected light from the first reflecting surface toward the first surface side. In each reflector row of the plurality of reflector rows, an angle between a straight line at which the first reflecting surface and the second reflecting surface meet and a plane in which the first direction and a second direction intersecting the first direction extend is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in the second direction. The light source is provided at the first surface side. Each of the plurality of dihedral corner reflectors is configured to cause a portion of a once-reflected light to travel toward the second reflecting surface, the once-reflected light being light that is emitted from the light source and reflected at the first reflecting surface. The light-transmitting member is configured to transmit a twice-reflected light, the twice-reflected light being a portion of the once-reflected light that is reflected at the second reflecting surface.

An image display device according to one embodiment of the invention includes an imaging element, a light source configured to irradiate light toward the imaging element, a light-shielding member configured to shield a portion of light of at least the light source, and a light-transmitting member that is arranged to transmit light emitted from the imaging element and selectively controls a transmission of light of at least some wavelengths of the light emitted from the imaging element. The imaging element includes a base member, and a reflector array provided on the base member, the base member including a first surface and a second surface positioned at a side opposite to the first surface, or a base member comprising a reflector array provided in a base member, the base member including a first surface and a second surface positioned at a side opposite to the first surface. The reflector array includes a plurality of reflector rows, the plurality of reflector rows including a plurality of dihedral corner reflectors arranged along a first direction. The plurality of reflector rows are arranged in a second direction to be parallel to each other with a spacing therebetween, the second direction intersecting the first direction. Each of the plurality of dihedral corner reflectors includes a first reflecting surface configured to reflect light from the first surface side, and a second reflecting surface orthogonal to the first reflecting surface and configured to reflect a reflected light reflected from the first reflecting surface toward the first surface side. In each reflector row of the plurality of reflector rows, an angle between a straight line at which the first reflecting surface and the second reflecting surface meet and a plane in which the first direction and the second direction intersect is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in one direction along the second direction. The light source is provided at the first surface side. Each of the plurality of dihedral corner reflectors is configured such that a portion of a reflected light travels toward the second reflecting surface, and another portion of the reflected light travels toward the second surface side, the reflected light being light that is emitted from the light source and reflected once at the first reflecting surface. The light-transmitting member is configured to transmit a twice-reflected light, the twice-reflected light being a portion of the reflected light, the portion being reflected at the second reflecting surface.

An image display device according to one embodiment of the invention includes an imaging element, a light source configured to irradiate light toward the imaging element, a light-shielding member configured to shield a portion of light of at least the light source, and a light-transmitting member that transmits light emitted from the imaging element and has a haze value of not more than 50%. The imaging element includes a base member and a reflector array provided on the base member, the base member including a first surface and a second surface positioned at a side opposite to the first surface, or a base member including a reflector array, the base member including a first surface and a second surface positioned at a side opposite to the first surface, The reflector array includes a plurality of reflector rows, the plurality of reflector rows including a plurality of dihedral corner reflectors arranged along a first direction. Each of the plurality of dihedral corner reflectors includes a first reflecting surface configured to reflect light from the first surface side, and a second reflecting surface oriented to be orthogonal to the first reflecting surface and configured to reflect a reflected light from the first reflecting surface toward the first surface side. In each reflector row of the plurality of reflector rows, an angle between a straight line at which the first reflecting surface and the second reflecting surface meet and a plane in which the first direction and a second direction intersecting the first direction extend is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in the second direction. The light source is provided at the first surface side. Each of the plurality of dihedral corner reflectors is configured to cause a portion of a once-reflected light to travel toward the second reflecting surface, the once-reflected light being light that is emitted from the light source and reflected at the first reflecting surface. The light-transmitting member is configured to transmit a twice-reflected light, the twice-reflected light being a portion of the once-reflected light that is reflected at the second reflecting surface.

An image display device according to one embodiment of the invention includes an imaging element, a light source configured to irradiate light toward the imaging element, a light-shielding member configured to shield a portion of light of at least the light source, and a light-transmitting member that transmits light emitted from the imaging element and has a haze value of not more than 50%. The imaging element includes a base member, and a reflector array provided on the base member, the base member including a first surface and a second surface positioned at a side opposite to the first surface, or a base member comprising a reflector array provided in a base member, the base member including a first surface and a second surface positioned at a side opposite to the first surface. The reflector array includes a plurality of reflector rows, the plurality of reflector rows including a plurality of dihedral corner reflectors arranged along a first direction. The plurality of reflector rows are arranged in a second direction to be parallel to each other with a spacing therebetween, the second direction intersecting the first direction. Each of the plurality of dihedral corner reflectors includes a first reflecting surface configured to reflect light from the first surface side, and a second reflecting surface orthogonal to the first reflecting surface and configured to reflect a reflected light reflected from the first reflecting surface toward the first surface side. In each reflector row of the plurality of reflector rows, an angle between a straight line at which the first reflecting surface and the second reflecting surface meet and a plane in which the first direction and the second direction intersect is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in one direction along the second direction. The light source is provided at the first surface side. Each of the plurality of dihedral corner reflectors is configured such that a portion of a reflected light travels toward the second reflecting surface, and another portion of the reflected light travels toward the second surface side, the reflected light being light that is emitted from the light source and reflected once at the first reflecting surface. The light-transmitting member is configured to transmit a twice-reflected light, the twice-reflected light being a portion of the reflected light, the portion being reflected at the second reflecting surface.

DETAILED DESCRIPTION

Figure 1:
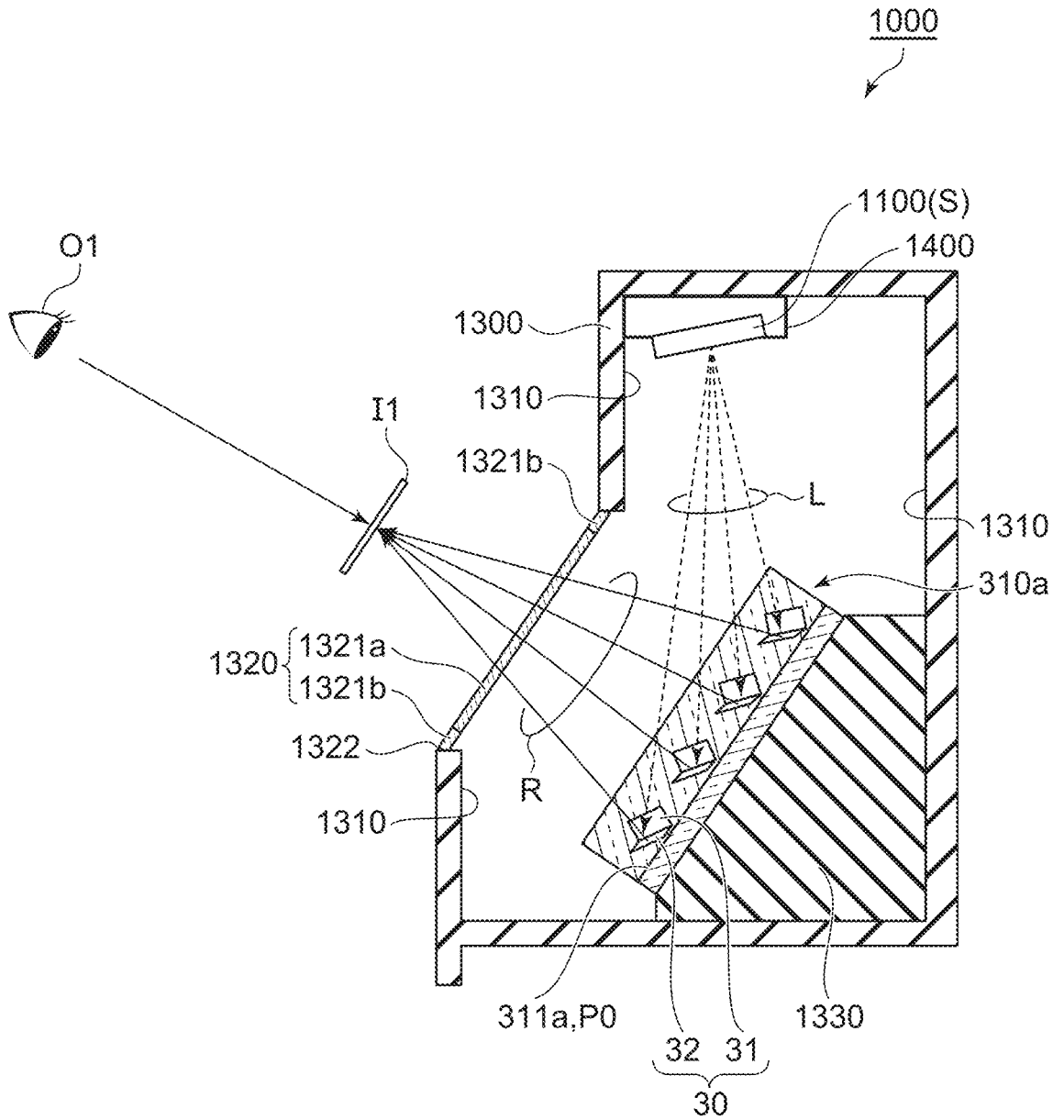
FIG. 1 is a schematic cross-sectional view illustrating an image display device according to a first embodiment.

Exemplary embodiments will now be described with reference to the drawings.

The drawings are schematic or conceptual, and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals, and a detailed description is omitted as appropriate.

First Embodiment

FIG. 1 is a schematic cross-sectional view illustrating an image display device according to a first embodiment.

As shown in FIG. 1, the image display device 1000 according to the embodiment includes an imaging element 310a, a display device 1100(S), a housing 1300, and a light-transmitting member 1320. The image display device 1000 uses the imaging element 310a to reflect a light L emitted from the display device 1100(S), and uses a reflected light R from the imaging element 310a to form a floating image in mid-air outside the housing 1300 via the light-transmitting member 1320. Because the display device 1100(S) outputs an image made of a set of the light L, an observer O1 can observe the image output from the display device 1100(S) as a floating image I1 formed outside the housing 1300.

The housing 1300 is located at the periphery of the display device 1100(S) and the imaging element 310a. That is, the display device 1100(S) and the imaging element 310a are located inside the housing 1300. In the example, the display device 1100(S) is located at the upper portion inside the housing 1300, and the imaging element 310a is located at the lower portion inside the housing 1300.

The imaging element 310a emits the light L incident from the display device 1100(S) obliquely upward as the reflected light R. The reflected light R is emitted in a direction perpendicular to a virtual plane P0 described below. The imaging element 310a is located at an imaging element mounting part 1330 and is, for example, fixed to the imaging element mounting part 1330, which is provided to support the virtual plane P0 in the direction in which the reflected light R is emitted.

The housing 1300 has any exterior shape. The housing 1300 houses the display device 1100(S) and the imaging element 310a in the interior. In the example, a control device 1400 and the imaging element mounting part 1330 also are located inside the housing 1300.

A light-shielding member 1310 is a portion of the housing 1300. For example, the light-shielding member 1310 is a light-absorbing layer located at the interior wall of the housing 1300. The light-absorbing layer is, for example, a coating layer of a black coating material. By providing the light-shielding member 1310 at the interior wall of the housing 1300 in the image display device 1000, a portion of the light emitted from the display device 1100(S) and the imaging element 310a is prevented from being reflected inside the housing 1300 to become stray light. The light-shielding member 1310 is a coating layer of a coating material and is sufficiently thin compared to the thickness of the constituent material of the housing 1300, and is therefore illustrated as the surface of the interior wall of the housing 1300 in FIG. 1.

The light-transmitting member 1320 is located at the position of a window frame 1322 formed in a portion of the housing 1300. The window frame 1322 is an opening positioned to face the imaging element 310a.

The reflected light R that is emitted from the imaging element 310a is transmitted by the light-transmitting member 1320 and forms the floating image I1 outside the housing 1300. That is, the light-transmitting member 1320 is located between the imaging element 310a and the position at which the floating image I1 is formed. When the observer O1 is present, the floating image I1 is formed between the observer O1 and the light-transmitting member 1320.

The light-transmitting member 1320 includes a colored portion 1321a. The colored portion 1321a is surrounded with a perimeter edge portion 1321b. The perimeter edge portion 1321b extends along the window frame 1322 of the light-transmitting member 1320. The colored portion 1321a controls the transmission of light of at least some wavelengths among wavelengths of light including the reflected light R emitted from the imaging element 310a.

The colored portion 1321a is a portion having the desired color such as black, brown, etc., and is formed of, for example, a black light-transmitting resin, black glass, etc. The colored portion 1321a may be formed by printing a black or other coating material on the surface of the light-transmitting member 1320, or may be a sticker formed of a light-transmitting raw material and adhered to the surface of the light-transmitting member 1320.

When the colored portion 1321a is black, the colored portion 1321a controls the luminance by absorbing a portion of substantially all wavelengths of visible light. That is, the light that is emitted from the colored portion 1321a is substantially uniformly attenuated. The colored portion 1321a is set so that the luminance of the reflected light R reflected by the imaging element 310a is sufficiently greater than the luminance of the other light, and so the observer O1 can observe the floating image I1 with high contrast without perceiving light other than the floating image I1 formed by the reflected light R.

The perimeter edge portion 1321b is formed of a light-transmitting resin, glass, etc., of any color and is, for example, colored to be the same black as the colored portion 1321a. The perimeter edge portion 1321b may not be colored, or may be colored to be a different color from the colored portion 1321a.

The color of the colored portion 1321a is not limited to black, and the colored portion 1321a may selectively control the transmission of light of at least some wavelengths. For example, the colored portion 1321a may be an optical filter that selectively transmits the wavelength of the light emitted by the display device 1100(S).

As described below with reference to FIGS. 5 to 14, the imaging element 310a includes multiple dihedral corner reflectors 30 arranged in a matrix configuration on a first surface 311a. The first surface 311a is arranged to be substantially parallel to the opening of the window frame 1322 and the light-transmitting member 1320. The dihedral corner reflector 30 includes a first reflecting surface 31 and a second reflecting surface 32; the reflecting surfaces reflect the light once each, and the twice-reflected light of the dihedral corner reflector 30 is emitted as the reflected light R. The light-transmitting member 1320 and the window frame 1322 are arranged to transmit the twice-reflected light of the imaging element 310a.

In the image display device 1000 according to the embodiment, the display device 1100(S) and the imaging element 310a are arranged to form the floating image I1 directly above the imaging element 310a. "Directly above the imaging element 310a" is a position in the normal direction of the first surface 311a. In such an arrangement, there are cases where the imaging element 310a also emits a portion of the once-reflected light toward the first surface 311a side and forms false images and/or ghosts. According to the configuration of the imaging element 310a, there are also cases where light that is not reflected by any reflecting surface is emitted toward the first surface side. Accordingly, it is necessary to provide the light-shielding member 1310 at positions of the interior wall of the housing 1300 that shield at least the leakage light from the display device 1100(S) and the light other than the twice-reflected light of the imaging element 310a.

The image display device 1000 may include the control device 1400, etc. The control device 1400 supports the display device 1100(S) and performs, for example, six-axis control of the display device 1100(S). By performing six-axis control of the display device 1100(S), the control device 1400 can modify the angle of the optical axis of the display device 1100(S) and modify the distance between the display device 1100(S) and the imaging element 310a.

For example, the control device 1400 modifies the angle of the optical axis of the display device 1100(S) and modifies the distance between the display device 1100(S) and the imaging element 310a to form the floating image I1 at the position desired by the observer O1 according to an operation of the observer O1.

The configuration of the display device 1100(S) will now be described.

Figure 2A:
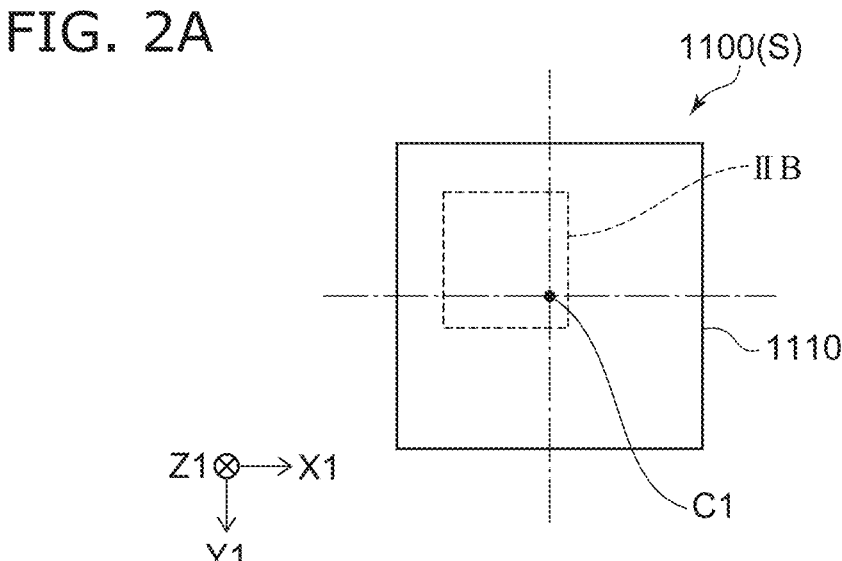
FIG. 2A is a schematic plan view illustrating a portion, i.e., a display device, of the image display device according to the first embodiment.

FIG. 2A is a schematic plan view illustrating a portion, i.e., the display device, of the image display device according to the first embodiment.

Figure 2B:
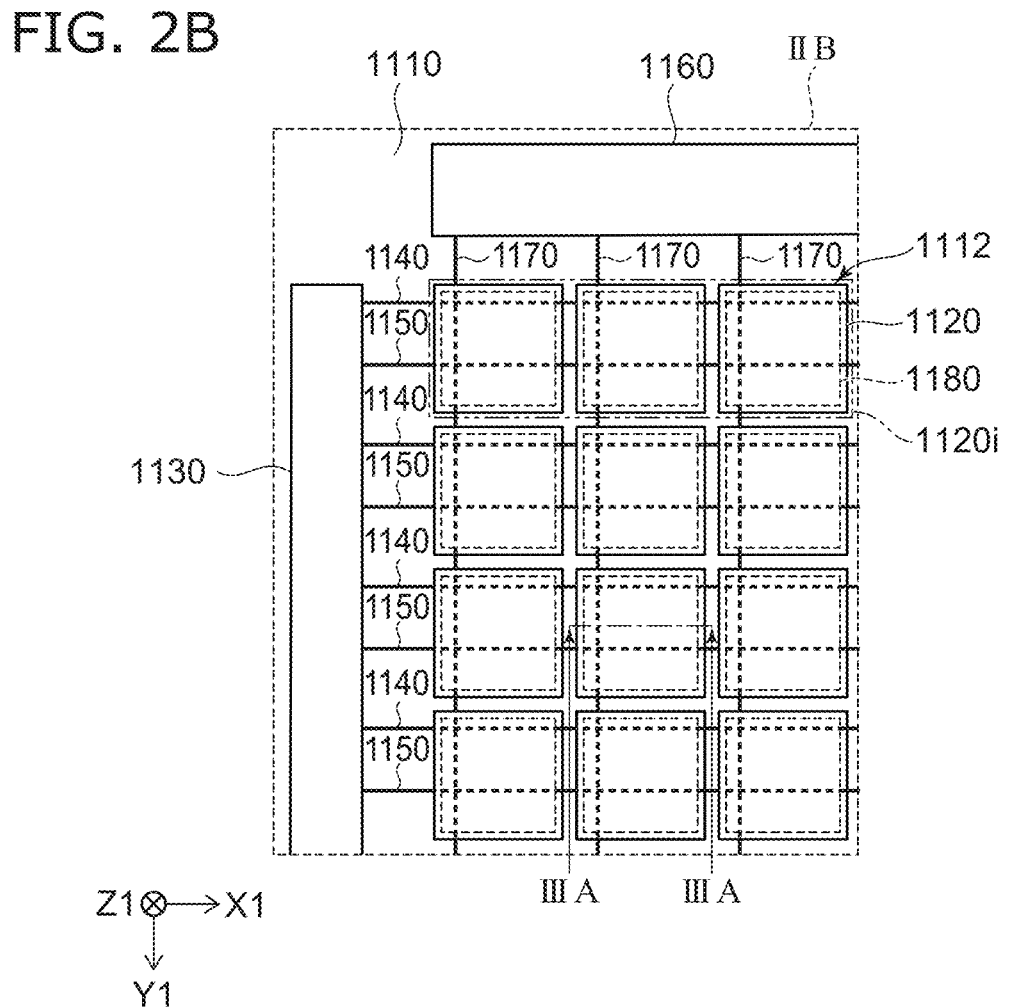
FIG. 2B is an enlarged schematic view of portion IIB of FIG. 2A.

FIG. 2B is an enlarged schematic view of portion IIB of FIG. 2A.

Figure 3A:
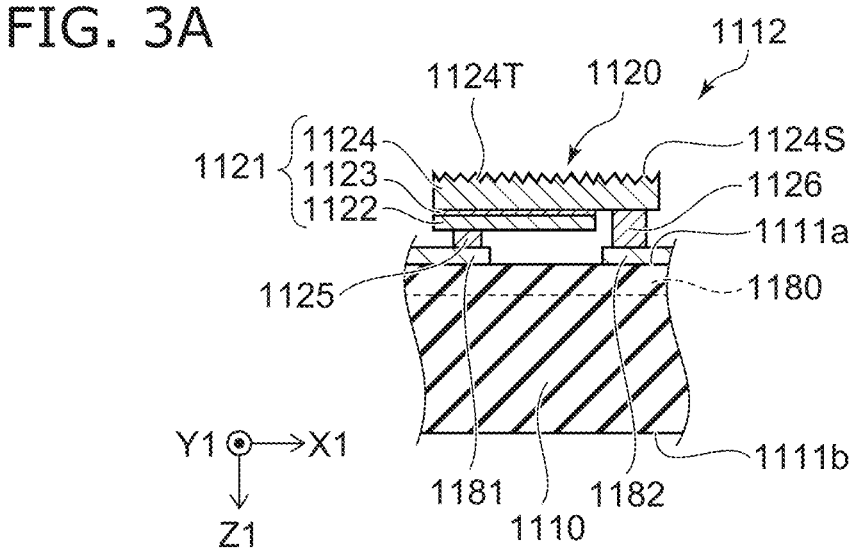
FIG. 3A is a schematic auxiliary cross-sectional view along line IIIA-IIIA of FIG. 2B.

FIG. 3A is a schematic auxiliary cross-sectional view along line IIIA-IIIA of FIG. 2B.

A three-dimensional orthogonal coordinate system may be used in the description of the display device 1100(S). The three-dimensional orthogonal coordinate system for the description of the display device 1100(S) is an orthogonal coordinate system including an X1-axis, a Y1-axis, and a Z1-axis. A direction parallel to the X1-axis may be called an "X1-direction"; a direction parallel to the Y1-axis may be called a "Y1-direction", and a direction parallel to the Z1-axis may be called a "Z1-direction". The X1Y1-plane that includes the X1-axis and the Y1-axis is parallel to a first surface 1111a of a substrate 1110 of the display device 1100(S). The first surface 1111a is a surface at which LED elements 1120 are arranged. The X1-axis is parallel to a row 1120i in which the LED elements 1120 are arranged. The Y1-axis is orthogonal to the X1-axis. The Z1-axis is orthogonal to the X1-axis and the Y1-axis and is the positive direction from the first surface 1111a toward a second surface 1111b. The second surface 1111b is positioned at the side opposite to the first surface 1111a of the substrate 1110.

According to the X1Y1Z1-orthogonal coordinate system, the display device 1100(S) emits light mainly in the negative direction of the Z1-axis.

As shown in FIG. 2A, the display device 1100(S) includes the substrate 1110 that is rectangular when the X1Y1-plane is viewed in plan. The substrate 1110 may include, for example, a resin such as glass, polyimide, or the like, or a Si substrate may be used. The display device 1100(S) has an optical axis C1 in the normal direction of the surface of the substrate 1110.

As shown in FIG. 2B, the display device 1100(S) includes multiple pixels 1112 as a light source. The display device 1100(S) uses the multiple pixels 1112 to display the desired image. The display device 1100(S) is electrically connected to a not-illustrated controller. The controller is provided inside the housing 1300 and/or outside the housing 1300 and supplies data related to the image displayed by the display device 1100(S). The display device 1100(S) displays a still image, a video image, etc., based on the data related to the image supplied from the controller.

The display device 1100(S) includes the substrate 1110, the multiple pixels 1112, a scanning circuit 1130, multiple scanning lines 1140, multiple lighting control lines 1150, a drive circuit 1160, and multiple signal lines 1170. The pixel 1112 includes LED elements 1120 and individual circuits 1180. The LED elements 1120, the scanning circuit 1130, the drive circuit 1160, and the individual circuits 1180 are shown simply as quadrilaterals to avoid complexity in the illustration of FIG. 2B.

The multiple LED elements 1120 are arranged in a matrix configuration. Hereinbelow, the multiple LED elements 1120 arranged in one row in the X1-direction are called the "row 1120*i*".

As shown in FIG. 3A, the substrate 1110 includes the first surface 1111*a* and the second surface 1111*b*. The second surface 1111*b* is at the side opposite to the first surface 1111*a*. The LED elements 1120 are arranged in a matrix configuration on the first surface 1111*a*. The LED elements 1120 are mounted face-down on the first surface 1111*a*. The LED elements are not limited to face-down mounting and may be mounted face-up on the first surface 1111*a*.

The LED element 1120 includes a semiconductor stacked body 1121, an anode electrode 1125, and a cathode electrode 1126. The semiconductor stacked body 1121 includes a p-type semiconductor layer 1122, an active layer 1123 located on the p-type semiconductor layer 1122, and an n-type semiconductor layer 1124 located on the active layer 1123. The semiconductor stacked body 1121 includes, for example, a gallium nitride compound semiconductor of $In_xAl_yGa_{1-X-Y}N$ ($0 \leq X$, $0 \leq Y$, and $X+Y<1$). According to the embodiment, the light that is emitted by the LED element 1120 is visible light.

The anode electrode 1125 is electrically connected to the p-type semiconductor layer 1122. The anode electrode 1125 also is electrically connected to the wiring part 1181 of the individual circuit 1180 described below with reference to FIG. 5. In the example shown in FIGS. 3A and 3B, the individual circuit 1180 is formed in a Si substrate. The cathode electrode 1126 is electrically connected to the n-type semiconductor layer 1124. The cathode electrode 1126 also is electrically connected to another wiring part 1182 of the individual circuit 1180. The anode electrode 1125 and the cathode electrode 1126 can include, for example, metal materials.

Multiple recesses 1124T are provided in a light-emitting surface 1124S of the LED element 1120. Hereinbelow, "the light-emitting surface of the LED element" means the surface of the LED element from which the light is mainly emitted. The light that is emitted from the light-emitting surface 1124S is incident on the imaging element 310*a*. The light-emitting surface 1124S is one surface of the n-type semiconductor layer 1124. More specifically, the light-emitting surface 1124S is positioned at the side of the n-type semiconductor layer 1124 opposite to the surface facing the active layer 1123.

Methods of forming the multiple recesses 1124T in the light-emitting surface 1124S include a method in which an n-type semiconductor layer is grown on a growth substrate in which protrusions are formed, a method in which surface roughening of the surface of the n-type semiconductor layer is performed by anisotropic etching, etc.

Thus, the LED element 1120 can emit light having a larger light distribution angle because the multiple recesses 1124T are provided in the light-emitting surface 1124S of the LED element 1120.

The configuration of the LED element is not limited to the configuration described above. For example, multiple protrusions instead of multiple recesses may be provided in the light-emitting surface of the LED element, or both multiple recesses and multiple protrusions may be provided. When the growth substrate is light-transmissive, the growth substrate may not be detached from the semiconductor stacked body, and at least one of multiple recesses or multiple protrusions may be provided in the surface of the growth substrate corresponding to the light-emitting surface.

The structure of the display device 1100(S) is not limited to the structure described above. Although the LED elements 1120 are individually mounted on the substrate 1110 in which the individual circuits 1180 are provided in the example above, the LED elements 1120 may be individually patterned from a semiconductor stacked body bonded on the substrate 1110 in which the individual circuits 1180 are provided, and then wired.

Figure 3B:
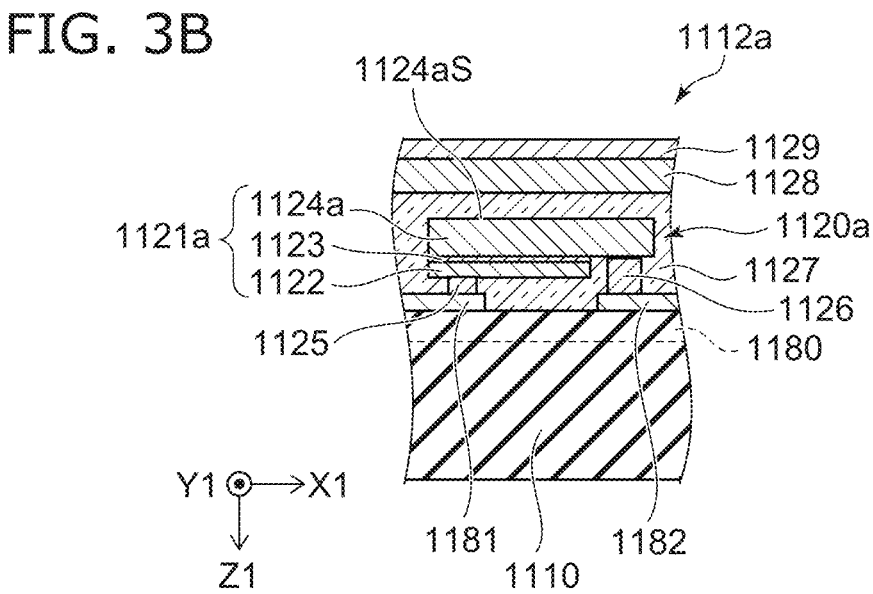
FIG. 3B is a schematic cross-sectional view illustrating a portion, i.e., a modification of the display device, of the image display device according to the first embodiment.

FIG. 3B is a schematic cross-sectional view illustrating a portion, i.e., a modification of the display device, of the image display device according to the first embodiment.

FIG. 3B corresponds to an auxiliary cross-sectional view along line IIIA-IIIA of FIG. 2B, and is an auxiliary cross-sectional view at the same position as the position shown in FIG. 3A.

As shown in FIG. 3B, a pixel 1112*a* includes the LED element 1120*a* and a wavelength conversion member 1128. Similarly to the pixel 1112 shown in FIG. 2B, the pixel 1112*a* includes the individual circuit 1180. As in the example shown in FIG. 3B, the pixel 1112*a* may further include a color filter 1129.

According to the modification, the LED element 1120*a* includes a semiconductor stacked body 1121*a*, the anode electrode 1125, and the cathode electrode 1126. The semiconductor stacked body 1121*a* includes the p-type semiconductor layer 1122, the active layer 1123, and an n-type semiconductor layer 1124*a*. The active layer 1123 is located on the p-type semiconductor layer 1122, and the n-type semiconductor layer 1124*a* is located on the active layer 1123. The n-type semiconductor layer 1124*a* includes a light-emitting surface 1124*a*S. The light-emitting surface 1124*a*S is a flat surface that does not include recesses or protrusions.

In the pixel 1112*a*, a protective layer 1127 covers the LED element 1120*a*, the wiring parts 1181 and 1182, and the first surface 1111*a* of the substrate 1110. The protective layer 1127 can include, for example, a light-transmitting material such as a polymer material including a sulfur (S)-including substituent group or phosphorus (P) atom-including group, a high refractive index nanocomposite material in which high refractive index inorganic nanoparticles are introduced to a polymer matrix of polyimide, etc.

The wavelength conversion member 1128 is located on the protective layer 1127. The wavelength conversion member 1128 includes at least one type of wavelength conversion material such as a general fluorescer material, a perovskite fluorescer material, a quantum dot (QD), etc. The light that is emitted from the LED element 1120*a* is incident on the wavelength conversion member 1128. The wavelength conversion material that is included in the wavelength conversion member 1128 converts the light into light of a different peak wavelength from the light emitted from the LED element 1120*a*, and emits the light. The light that is incident on the wavelength conversion member 1128 is scattered inside the wavelength conversion member 1128; therefore, the light that is emitted by the wavelength conversion member 1128 is emitted with a wider light distribution angle.

The color filter 1129 is located on the wavelength conversion member 1128. The color filter 1129 can shield the greater part of the light that is emitted from the LED element 1120a and does not undergo wavelength conversion by the wavelength conversion member 1128. Accordingly, the light that is emitted by the wavelength conversion member 1128 is the main light emitted from the pixel 1112a.

According to the modification, the light emission peak wavelength of the LED element 1120a may be in the ultraviolet region or the visible light region. When blue light is to be emitted from at least one pixel 1112a, the blue light may be emitted from the LED element 1120a belonging to the pixel 1112a without providing the wavelength conversion member 1128 and the color filter 1129 in the pixel 1112a.

In the LED element, an n-type semiconductor layer may be arranged to face the substrate 1110; an active layer and a p-type semiconductor layer may be stacked in this order on the n-type semiconductor layer, and the surface of the p-type semiconductor layer at the side opposite to the surface facing the active layer may be used as the light-emitting surface of the LED element.

As shown in FIG. 2B, for example, the scanning circuit 1130 is located at the substrate 1110 to be adjacent to the multiple LED elements 1120, which are arranged in a matrix configuration, in the X1-direction when viewed in plan. The scanning circuit 1130 is configured to sequentially switch, in the Y1-direction, the row 1120i that is driven. The multiple scanning lines 1140 extend in the X1-direction from the scanning circuit 1130. The multiple lighting control lines 1150 extend in the X1-direction from the scanning circuit 1130. The multiple scanning lines 1140 and the multiple lighting control lines 1150 are alternately arranged in the Y1-direction.

The drive circuit 1160 is located at the substrate 1110 to be adjacent to the multiple LED elements 1120, which are arranged in the matrix configuration, in the Y1-direction when the X1Y1-plane is viewed in plan. The drive circuit 1160 is configured to control the outputs of the LED elements 1120 belonging to the row 1120i that is driven. The multiple signal lines 1170 extend in the Y1-direction from the drive circuit 1160. The multiple signal lines 1170 are arranged in the X1-direction. The drive circuit 1160 may include an IC chip, and the IC chip may be mounted on the substrate 1110.

For example, the scanning circuit 1130, the multiple scanning lines 1140, the multiple lighting control lines 1150, the drive circuit 1160, the multiple signal lines 1170, and the individual circuit 1180 may be formed on the substrate 1110 by a low-temperature polysilicon (LTPS) process.

In the example, one pixel 1112 includes one individual circuit 1180 and one LED element 1120. Multiple LED elements 1120 may be included in one pixel 1112. When multiple LED elements 1120 are included in one pixel 1112, one individual circuit may correspond to multiple LED elements. Or, the individual circuit 1180 may be provided for each LED element 1120 in one pixel 1112.

Figure 4:
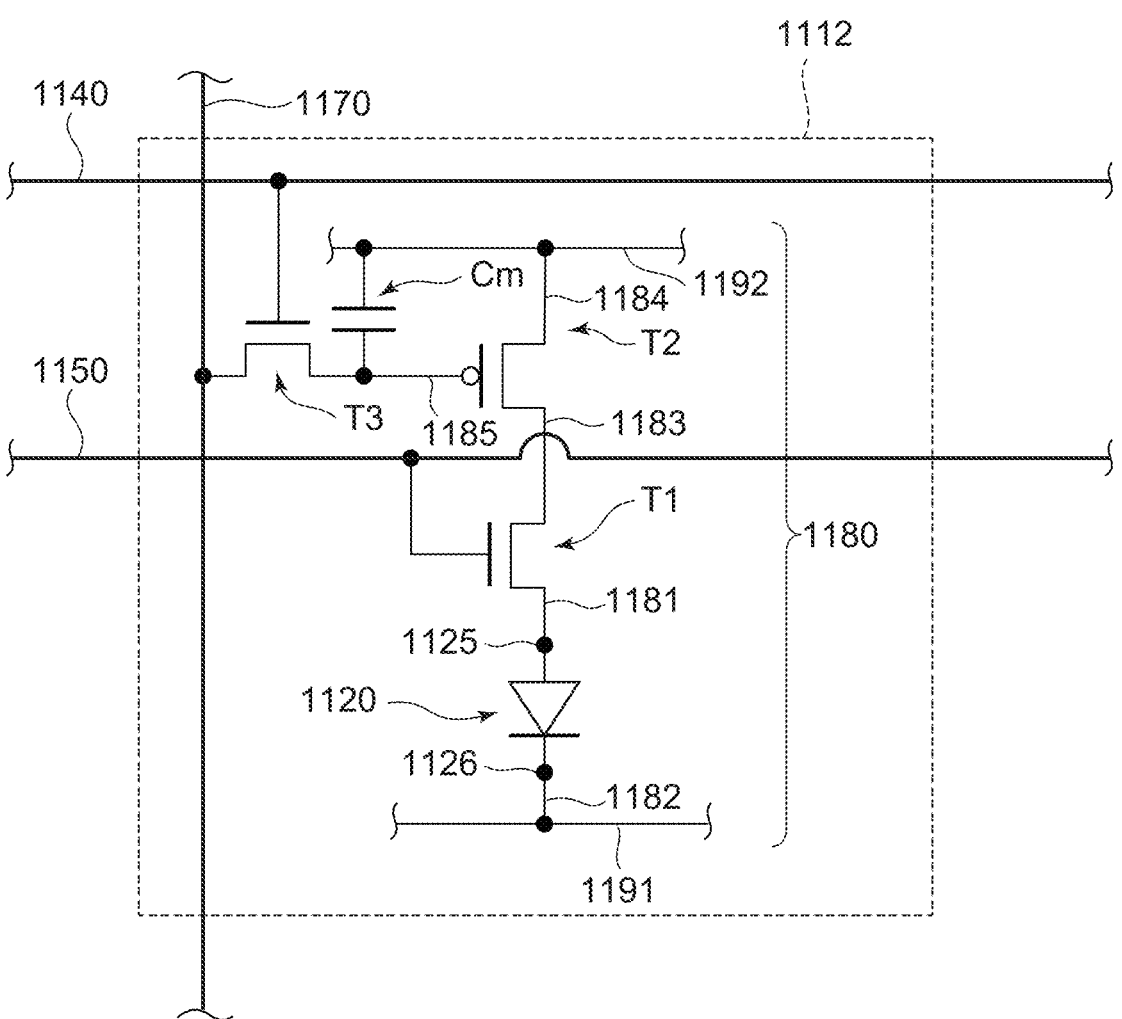
FIG. 4 is a schematic equivalent circuit diagram illustrating a portion, i.e., the display device, of the image display device according to the first embodiment.

FIG. 4 is a schematic equivalent circuit diagram illustrating a portion, i.e., the display device, of the image display device according to the first embodiment.

As shown in FIG. 4, the individual circuit 1180 includes a first transistor T1, a second transistor T2, a third transistor T3, a capacitor Cm, and multiple wiring parts 1181 to 1185. The first transistor T1 and the third transistor T3 are n-channel MOSFETs. The second transistor T2 is a p-channel MOSFET.

The cathode electrode 1126 of the LED element 1120 is electrically connected to a ground line 1191 via the wiring part 1182. For example, a voltage that is used as a reference is applied to the ground line 1191. The anode electrode 1125 of the LED element 1120 is electrically connected to the source electrode of the first transistor T1 via the wiring part 1181.

The gate electrode of the first transistor T1 is electrically connected to the lighting control line 1150. The drain electrode of the first transistor T1 is electrically connected to the drain electrode of the second transistor T2 via a wiring part 1183. The source electrode of the second transistor T2 is electrically connected to a power supply line 1192 via a wiring part 1184. A sufficiently higher voltage than the voltage used as the reference is applied to the power supply line 1192. Although not illustrated, a DC power supply is connected to the power supply line 1192 and the ground line 1191, and a positive DC voltage with respect to the reference voltage applied to the ground line 1191 is applied between the power supply line 1192 and the ground line 1191.

The gate electrode of the second transistor T2 is electrically connected to the drain electrode of the third transistor T3 via the wiring part 1185. The source electrode of the third transistor T3 is electrically connected to the signal line 1170. The gate electrode of the third transistor T3 is electrically connected to the scanning line 1140.

The wiring part 1185 is electrically connected to one terminal of the capacitor Cm. The other terminal of the capacitor Cm is electrically connected to the power supply line 1192.

The scanning circuit 1130 selects one row 1120i among the multiple rows and outputs an on-signal to the scanning line 1140 electrically connected to the row 1120i. Accordingly, the third transistors T3 of the individual circuits 1180 corresponding to the row 1120i are in a state in which the third transistors T3 can be switched on. The drive circuit 1160 outputs, to the signal lines 1170, drive signals including drive signal voltages corresponding to the set outputs of the LED elements 1120 belonging to the row 1120i. Accordingly, the drive signal voltages are stored in the capacitors Cm. The drive signal voltages set the second transistors T2 of the individual circuits 1180 corresponding to the row 1120i to a state in which the second transistors T2 can be switched on.

The scanning circuit 1130 outputs, to the lighting control line 1150 electrically connected to the row 1120i, a control signal that sequentially switches the first transistors T1 of the row 1120i on and off. When the first transistors T1 are in the on-state, the light emission luminances of the LED elements 1120 are controlled by currents corresponding to the drive signal voltages stored in the capacitors Cm flowing in the LED elements 1120 belonging to the row 1120i. The light emission periods of the LED elements 1120 are controlled for each row 1120i by switching the first transistors T1 on and off.

The scanning circuit 1130 sequentially switches, in the Y1-direction, the scanning line 1140 to which the on-signal is output and the lighting control line 1150 to which the control signal is output. Accordingly, the row 1120i that is driven is sequentially switched in the Y1-direction.

The configurations of the scanning circuit, the multiple scanning lines, the multiple lighting control lines, the drive circuit, the multiple signal lines, the multiple individual circuits, etc., are not limited to those described above. For example, the individual circuit may be made of a second transistor, a third transistor, a capacitor, and wiring parts without including a first transistor; multiple scanning lines may extend from the scanning circuit, and a lighting control line may not be provided. The scanning lines, the lighting control lines, the signal lines, and the wiring parts and the like of the individual circuits may not be on the surface of the substrate, and may be provided inside the substrate. The electrical elements such as the transistors, the capacitors, and the like included in the drive circuit may be separately manufactured and then mounted on the substrate instead of being formed on the substrate. Instead of separately manufacturing the LED elements and then mounting to the substrate, the LED elements may be formed on the substrate by using a semiconductor material such as Si or the like as the substrate. In such a case, each transistor element may be a silicon semiconductor element provided on the silicon substrate 1110 instead of a low-temperature polysilicon element provided on the glass substrate 1110.

The display device that includes the LED element as described above is favorable in that a sufficient light emission luminance is realized with low power consumption; however, the display device is not limited thereto. Instead of an LED display using an LED element such as that described above, the display device may be an OLED display, a liquid crystal display, etc.

A configuration of the imaging element 310$a$ will now be described in detail.

Figure 5:
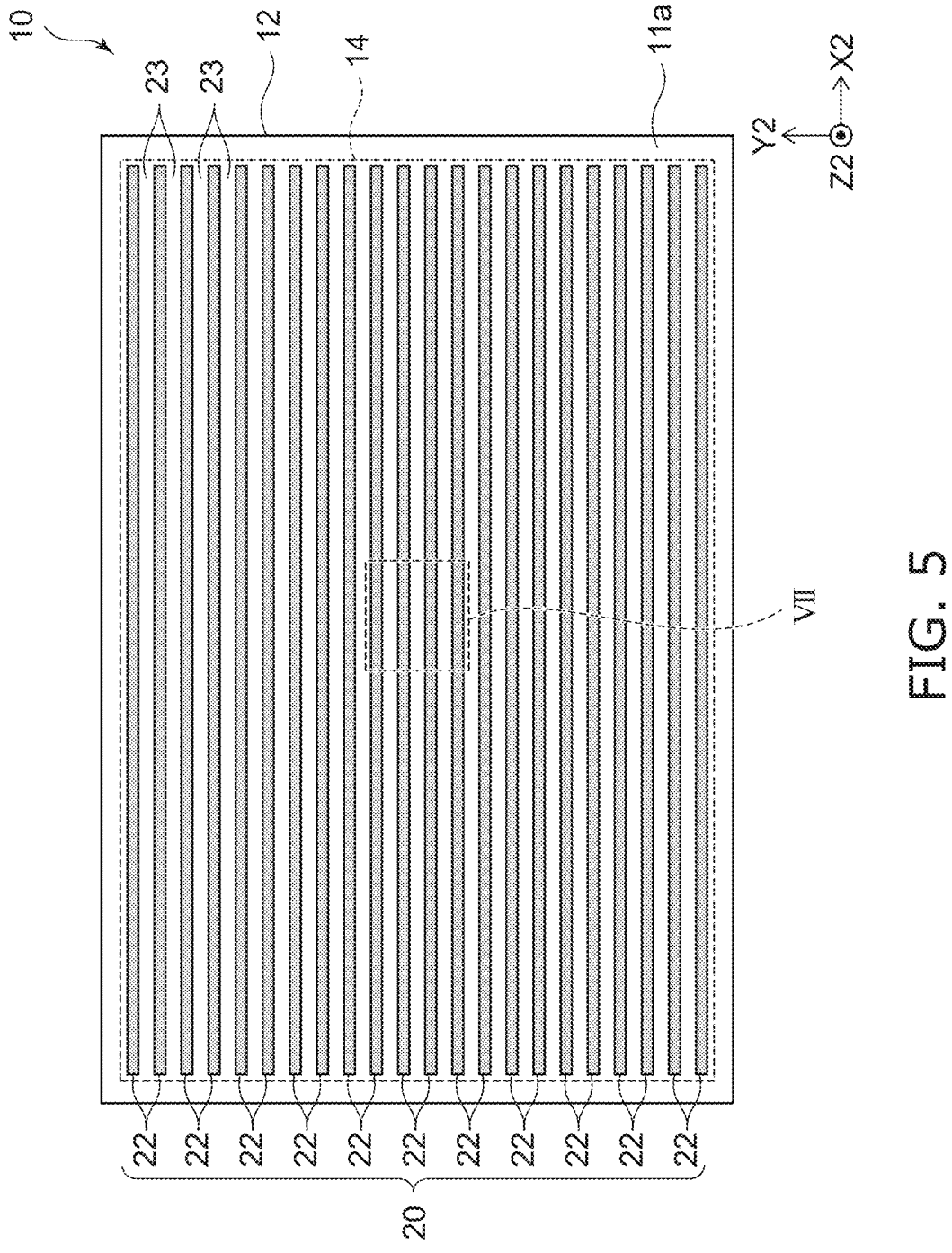
FIG. 5 is a schematic plan view illustrating a portion, i.e., an imaging element, of the image display device.

FIG. 5 is a schematic plan view illustrating a portion, i.e., an imaging element, of the image display device.

As shown in FIG. 1, the image display device 1000 according to the embodiment includes the imaging element 310$a$. The imaging element 310$a$ shown in FIG. 1 is one of many variations of imaging element configurations. The following description includes the operation principle of the imaging element forming the floating image in mid-air. First, the configuration and operation of the imaging element 10 will be described.

As shown in FIG. 5, the imaging element 10 includes a base member 12 and a reflector array 20. The base member 12 includes a first surface 11$a$, and the reflector array 20 is provided on the first surface 11$a$. In the example shown in FIG. 5, the reflector array 20 is provided inside a reflector formation region 14 of the first surface 11$a$. The reflector array 20 includes multiple reflector rows 22. The reflector array 20 may be provided in the base member 12. That is, the reflector array 20 and the base member 12 may be formed as a continuous body. In such a case, the first surface 11$a$ of the base member 12 is the dihedral corner reflectors of the reflector array 20 described below.

A configuration of the base member 12 will now be described.

Figure 6:
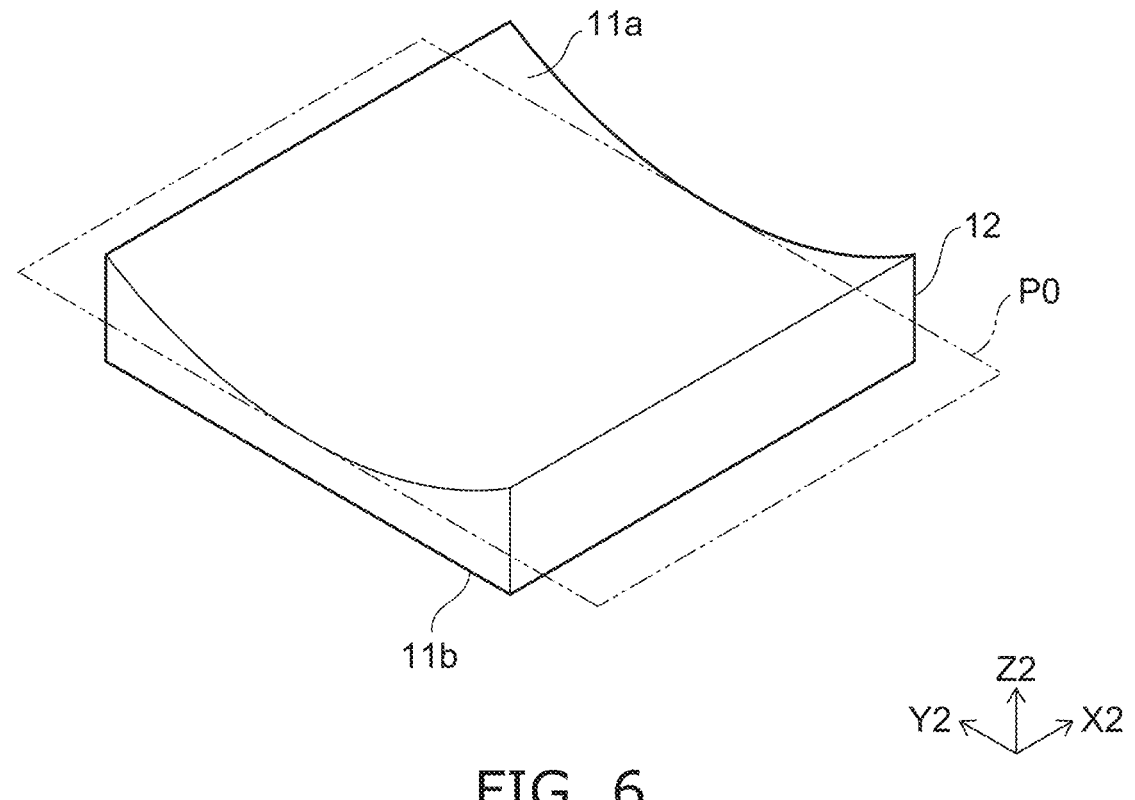
FIG. 6 is a schematic perspective view illustrating a portion, i.e., a base member, of the imaging element of FIG. 5.

FIG. 6 is a schematic perspective view illustrating a portion, i.e., a base member, of the imaging element of FIG. 5.

As shown in FIG. 6, the base member 12 includes the first surface 11$a$ and a second surface 11$b$. The second surface 11$b$ is positioned at the side opposite to the first surface 11$a$.

The three-dimensional orthogonal coordinate system used in the description of the imaging element may be different from the three-dimensional orthogonal coordinate system of the description of the display device 1100(S) shown in FIG. 2A, etc. The three-dimensional orthogonal coordinate system for the description of the imaging element is an orthogonal coordinate system including an X2-axis, a Y2-axis, and a Z2-axis. A direction parallel to the X2-axis may be called the "X2-direction"; a direction parallel to the Y2-axis may be called the "Y2-direction", and a direction parallel to the Z2-axis may be called the "Z2-direction". The X2Y2-plane that includes the X2-axis and the Y2-axis is defined as a plane parallel to the virtual plane P0. The first surface 11$a$ is located at the positive Z2-axis side of the second surface 11$b$. The first surface 11$a$ includes a portion of a circular arc that is convex toward the negative Z2-axis side when the Y2Z2-plane is viewed in plan. In the specific example below, the virtual plane P0 is a virtual surface parallel to a tangent plane contacting a point on the circular arc positioned furthest in the negative direction of the Z2-axis.

As described above, the first surface 11$a$ is a curved surface, and the reflector array 20 is located on the curved surface. The virtual plane P0 is used as a reference surface when setting the tilt in the Y2-axis direction of the reflector row 22. In other words, the reflector row 22 is arranged on the first surface 11$a$ at an angle set with respect to the virtual plane P0.

The base member 12 is formed of a light-transmitting material and is formed of, for example, a transparent resin.

In the imaging element 10, when the light source is located at the first surface 11$a$ side when referenced to the base member 12, the floating image is formed not at the second surface 11$b$ side, but at the first surface 11$a$ side at which the light source is located. The position at which the floating image is formed can be different from the position at which the light source is located and sufficiently separated from the position at which the light source is located.

The description continues now by returning to FIG. 5.

The reflector row 22 extends along the X2-direction. The multiple reflector rows 22 are arranged to be substantially parallel to each other along the Y2-direction. The multiple reflector rows 22 are arranged at substantially uniform spacing with a spacing 23 interposed in the Y2-direction respectively between the adjacent reflector rows 22. The length in the Y2-direction of the spacing 23 of the reflector rows 22 can be any length, and can be, for example, about the length in the Y2-direction of the reflector row 22. When the light source is located at the first surface 11$a$ side, light rays that are not reflected by the reflector rows 22, reflected light that is reflected once by the reflector rows 22, and the like are incident on the region in which the spacing 23 of the reflector rows 22 is formed. Such light rays do not contribute to the floating image; therefore, the ratio of the light rays incident on the imaging element 10 that contribute to the floating image decreases as the spacing 23 increases. Therefore, the length in the Y2-direction of the spacing 23 is set to an appropriate length according to the efficiency of the reflecting surfaces, the dimensions of the dihedral corner reflector 30 described below with reference to FIG. 7, etc.

Each of the reflector rows 22 includes many dihedral corner reflectors connected in the X2-direction and is therefore shown filled-in to avoid complexity in FIG. 5. In the example shown in FIG. 5, the imaging element 10 has a laterally-long shape in the X2-direction. This is because the shape is advantageous for binocular viewing of the floating image. The shape of the imaging element 10 when the X2Y2-plane is viewed in plan is not limited thereto, and a longitudinally-long shape in the Y2-direction may be selected according to the application.

When a mid-air image is formed in the normal direction of the first surface 311$a$ of the imaging element 310$a$ as in the image display device 1000 shown in FIG. 1, the spacing of the adjacent reflector rows 22 may not be provided. When the spacing of the adjacent reflector rows 22 is provided, the spacing that is provided may be a reflecting surface.

Figure 7:
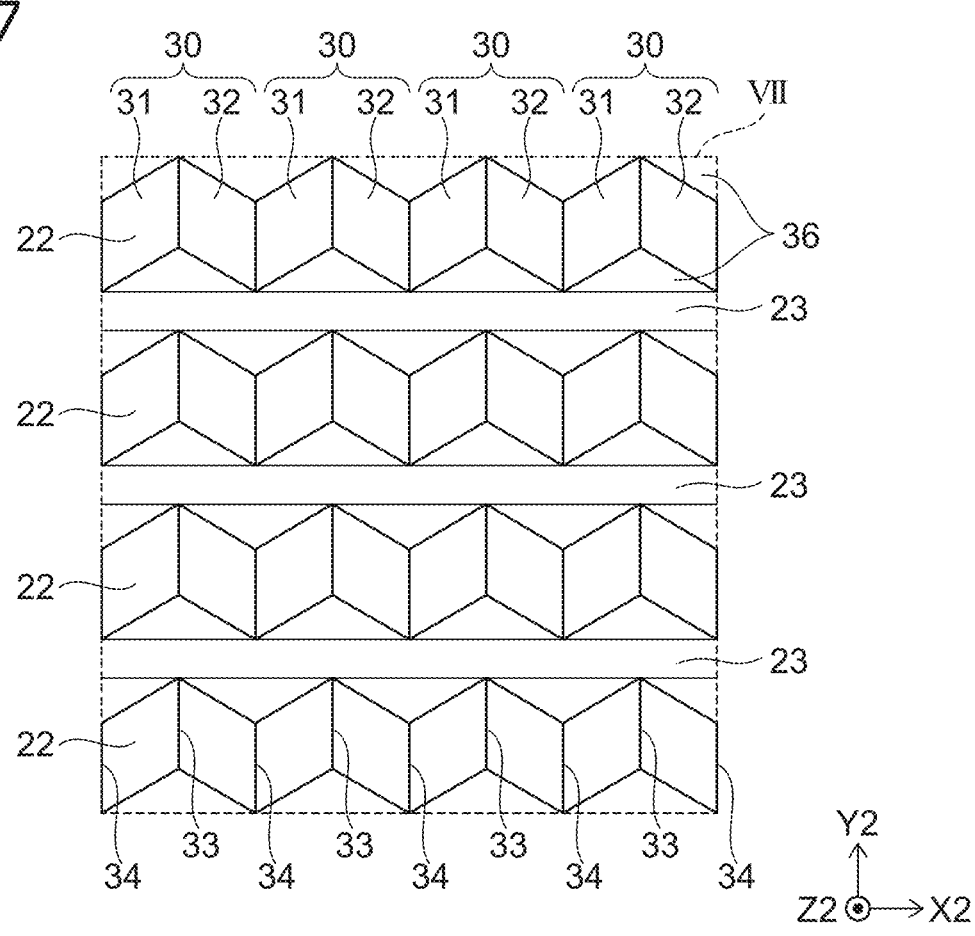
FIG. 7 is an enlarged schematic view of portion VII of FIG. 5.

FIG. 7 is an enlarged schematic view of portion VIII of FIG. 6.

As shown in FIG. 7, the reflector row 22 includes the multiple dihedral corner reflectors 30. The multiple dihedral corner reflectors 30 are connected to each other along the X2-direction and are provided continuously. The dihedral corner reflector 30 includes the first reflecting surface 31 and the second reflecting surface 32. The dihedral corner reflector 30 is located on a base part 36 formed on the first surface 11$a$ shown in FIG. 6. The first reflecting surface 31 and the second reflecting surface 32 each are substantially square when viewed in front-view, and the reflecting surfaces are connected to each other at one side of each of the squares so that the reflecting surfaces are substantially orthogonal to the orientation of the valley.

Hereinbelow, the connecting line between the first and second reflecting surfaces 31 and 32 of the dihedral corner reflector 30 is called a valley-side connecting line 33. The side of the first reflecting surface 31 positioned at the side opposite to the valley-side connecting line 33 and the side of the second reflecting surface 32 positioned at the side opposite to the valley-side connecting line 33 each are called hill-side connecting lines 34.

The first reflecting surface 31 of the dihedral corner reflector 30 is connected at the hill-side connecting line 34 to the second reflecting surface 32 of the dihedral corner reflector 30 adjacent at the negative X2-axis side. The second reflecting surface 32 of the dihedral corner reflector 30 is connected at the hill-side connecting line 34 to the first reflecting surface 31 of another dihedral corner reflector 30 adjacent at the positive X2-axis side. Thus, the multiple dihedral corner reflectors 30 are connected to each other along the X2-direction and are provided continuously.

In the imaging element 10 of the embodiment, the dimensions of the first and second reflecting surfaces 31 and 32 can be, for example, several µm to several hundred µm. For example, the number of integrated dihedral corner reflectors 30 is set according to the size, resolution, and the like of the mid-air image to be displayed. For example, several tens to several thousand dihedral corner reflectors 30 are integrated in one imaging element 10. For example, one thousand dihedral corner reflectors including 100 µm-square reflecting surfaces can be arranged over about 14 cm in the Y2-direction.

As in the enlarged view shown in FIG. 7, the reflector rows 22 of the imaging element 10 are arranged so that the positions in the X2-axis direction of the valley-side connecting line 33 and the hill-side connecting line 34 are respectively the same. This arrangement is not limited thereto; the positions in the X2-axis direction of the valley-side connecting line 33 and the hill-side connecting line 34 may be shifted between the reflector rows 22.

Figure 8A:
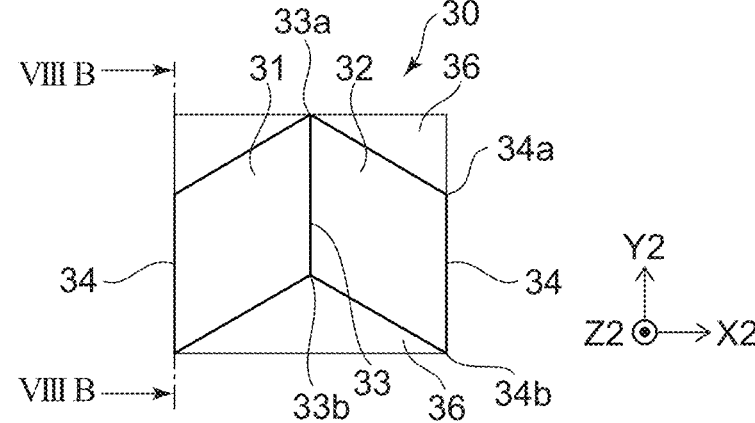
FIG. 8A is a schematic plan view illustrating a portion, i.e., a dihedral corner reflector, of the imaging element of FIG. 7.

FIG. 8A is a schematic plan view illustrating a portion, i.e., the dihedral corner reflector, of the imaging element of FIG. 7.

Figure 8B:
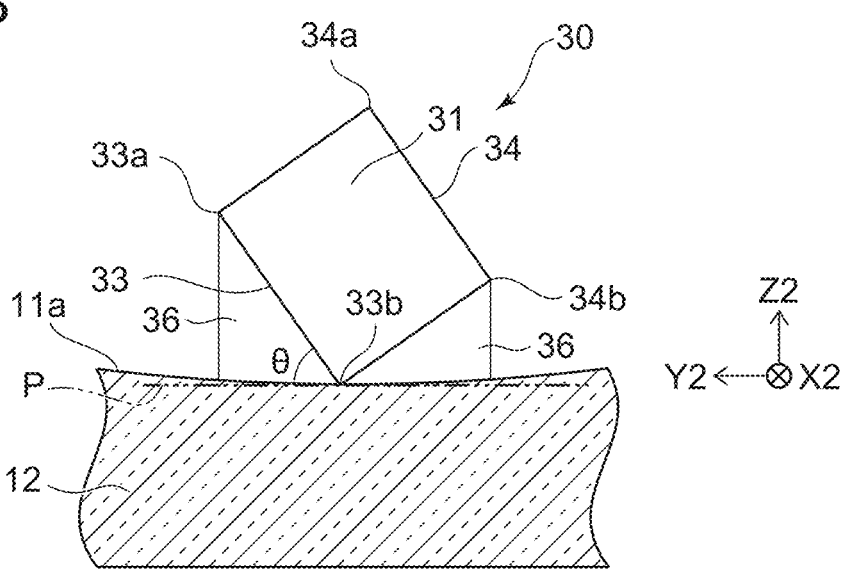
FIG. 8B is an example of a schematic auxiliary cross-sectional view along line VIIIB-VIIIB of FIG. 8A.

FIG. 8B is an example of a schematic auxiliary cross-sectional view along line VIIIB-VIIIB of FIG. 8A.

As shown in FIGS. 8A and 8B, the dihedral corner reflector 30 includes the first reflecting surface 31 and the second reflecting surface 32, and the first reflecting surface 31 and the second reflecting surface 32 are located on the base part 36. The base part 36 is arranged so that the first reflecting surface 31 and the second reflecting surface 32 have the desired angle with respect to a tangent plane P of the first surface 11$a$.

The base part 36 is formed in a V-shape, is a light-transmitting member, is formed of, for example, a transparent resin, and is formed as a continuous body with the base member 12. The first reflecting surface 31 and the second reflecting surface 32 are formed by thin film formation of a light-reflective metal material or the like at the formation location of the V-shape of the base member 12. The formation is not limited to such an example; each or a portion of the first reflecting surface 31, the second reflecting surface 32, the base part 36, and the base member 12 may be formed separately, and assembled as one to form the imaging element 10. For example, mirror finishing or the like of the surface of the transparent resin is performed, and the first reflecting surface 31 and the second reflecting surface 32 can be used as-is as the surface of the transparent resin when the surface reflectance of the transparent resin is sufficiently high. It is favorable for the spacing 23 and/or the base part 36 to be light-transmissive or light-absorbing to prevent false image observation, etc.

The dihedral corner reflector 30 may be formed as follows. The first reflecting surface 31 and the second reflecting surface 32 are formed in the surface of the transparent resin. The first reflecting surface 31 and the second reflecting surface 32 that are formed are exposed in air and arranged so that light incident from the surface opposite to the surface at which the first reflecting surface 31 and the second reflecting surface 32 are formed. As a result, the first reflecting surface 31 and the second reflecting surface 32 can function as total reflection surfaces due to the refractive index difference between the transparent resin and the air.

The first reflecting surface 31 and the second reflecting surface 32 are connected at the valley-side connecting line 33 to be substantially orthogonal. The hill-side connecting line 34 of the first reflecting surface 31 is positioned at the side opposite to the valley-side connecting line 33, and the hill-side connecting line 34 of the second reflecting surface 32 is positioned at the side opposite to the valley-side connecting line 33.

The end portions of the valley-side connecting line 33 are called vertices 33$a$ and 33$b$. The position of the vertex 33$a$ is further toward the positive Z2-axis side than the position of the vertex 33$b$. That is, the vertex 33$a$ is positioned to be more distal to the base member 12 than the vertex 33$b$. The end portions of the hill-side connecting line 34 are called vertices 34$a$ and 34$b$. The position of the vertex 34$a$ is further toward the positive Z2-axis side than the position of the vertex 34$b$. That is, the vertex 34$a$ is positioned to be more distal to the base member 12 than the vertex 34$b$. Accordingly, the vertex 34$a$ is positioned to be furthest from the base member 12, and the vertex 33$b$ is positioned to be most proximate to the base member 12.

FIG. 8B shows the relationship between the dihedral corner reflector 30, the first surface 11$a$, and the tangent plane P. The dihedral corner reflector 30 contacts the first surface 11$a$ at the vertex 33$b$ at the lower side of the valley-side connecting line 33. The tangent plane P contacts the first surface 11$a$ at the position of the vertex 33$b$. The dihedral corner reflector 30 is located on the first surface 11$a$ so that the valley-side connecting line 33 forms an angle θ with the tangent plane P.

Figure 8C:
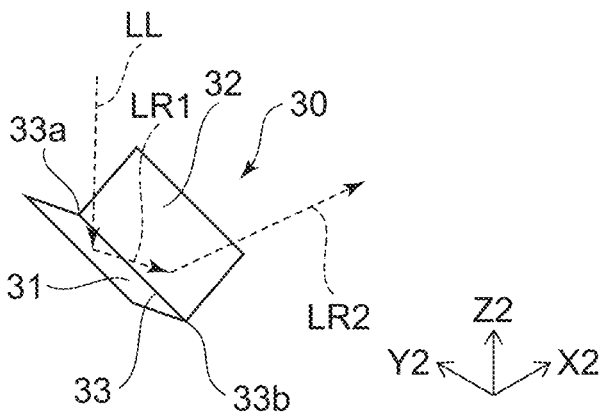
FIG. 8C is a schematic perspective view for describing an operation of the dihedral corner reflector of FIG. 8A.
Figure 8D:
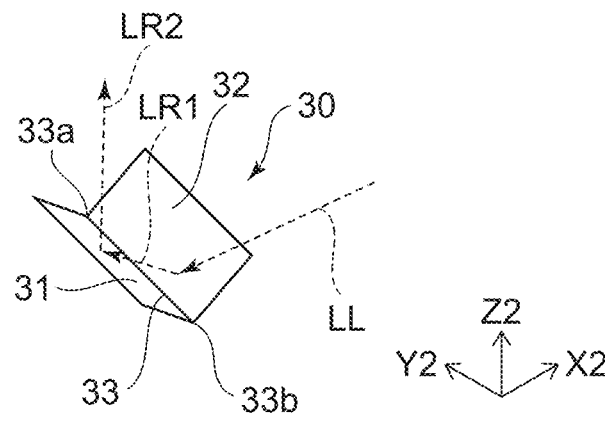
FIG. 8D is a schematic perspective view for describing an operation of the dihedral corner reflector of FIG. 8A.

FIGS. 8C and 8D are schematic perspective views for describing the operation of the dihedral corner reflector of FIG. 8A.

As shown in FIG. 8C, when a light ray LL is incident on the first reflecting surface 31, the light ray LL is reflected by the first reflecting surface 31. A once-reflected light LR1 that is reflected by the first reflecting surface 31 is re-reflected by the second reflecting surface 32. A twice-reflected light LR2 that is reflected by the second reflecting surface 32 is emitted toward the same side as the light source of the incident light. Thus, the dihedral corner reflector 30 emits the incident light from the first surface 11a side toward a different position from the position of the light source at the first surface 11a side. Thus, the dihedral corner reflector 30 reflects the light twice by two reflecting surfaces, and reflects the twice-reflected light LR2 toward the side from which the incident light ray LL traveled.

The reflection operation of the dihedral corner reflector 30 is reversible. When the light ray that is incident on the dihedral corner reflector 30 is incident along the opposite direction along the twice-reflected light LR2 in FIG. 8C, the light ray is reflected in the opposite direction along the incident light ray LL. Specifically, as shown in FIG. 9D, the light ray LL that is incident on the dihedral corner reflector 30 is reflected by the second reflecting surface 32 and incident on the first reflecting surface 31 as the once-reflected light LR1. The once-reflected light LR1 is reflected by the first reflecting surface 31 and emitted as the twice-reflected light LR2.

As shown in FIGS. 7 and 8A, the dihedral corner reflector 30 is line-symmetric with respect to the valley-side connecting line 33, and is arranged so that the angle of the first reflecting surface 31 with respect to the tangent plane P is substantially equal to the angle of the second reflecting surface 32 with respect to the tangent plane P. Therefore, when the light ray is initially incident on the first reflecting surface 31, the dihedral corner reflector 30 emits the reflected light by an operation similar to when the light ray is initially incident on the second reflecting surface 32. For example, in FIG. 8C, the light ray LL is initially incident on the first reflecting surface 31 and reflected by the first reflecting surface 31; however, the operation of the dihedral corner reflector 30 can be similar to the operation described above even when the light ray LL is initially incident on the second reflecting surface 32 and reflected by the second reflecting surface 32. In FIG. 8D, the light ray LL may be initially incident on the first reflecting surface 31, and the once-reflected light from the first reflecting surface 31 may be reflected by the second reflecting surface 32 and emitted as the second reflected light. Unless otherwise noted in the description of the operation of the imaging element herein-below, the case where the light ray LL is initially reflected by the first reflecting surface 31 will be described.

Figure 9:
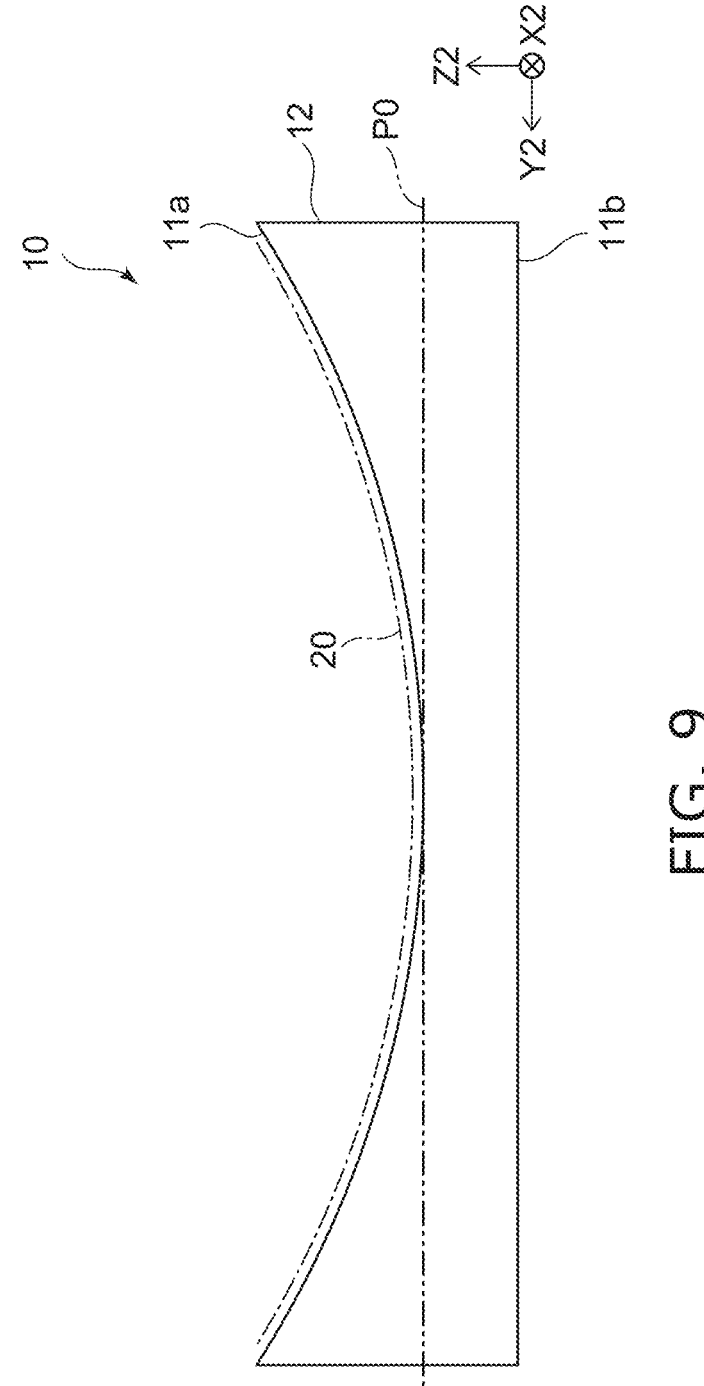
FIG. 9 is a schematic side view illustrating the imaging element of FIG. 5.

FIG. 9 is a schematic side view illustrating the imaging element of FIG. 5.

In FIG. 9, the reflector array 20 is shown by an envelope connecting the vertices 33a of the dihedral corner reflectors 30 shown in FIGS. 8A and 8B. In side views illustrating the imaging element hereinbelow, the reflector array 20 is illustrated by illustrating the envelope of the vertices 33a of the dihedral corner reflectors 30 as a single dot-dash line as shown in FIG. 9 unless it is necessary to show and describe the configuration of the dihedral corner reflector 30.

In the imaging element 10 as shown in FIG. 9, the reflector array 20 is provided in a curved shape because the first surface 11a is a curved surface. The first surface 11a includes a portion of a circular arc that is convex toward the negative Z2-axis side when the Y2Z2-plane is viewed in plan; the reflector array 20 also is provided in an arc-like shape, and the envelope of the vertices also is a circular arc. The radius of the circular arc is set based on the distance between the imaging element 10 and the light source located at the first surface 11a side of the imaging element 10. For example, the radius of the circular arc of the reflector array 20 is set to about 2 times the distance between the imaging element 10 and the light source.

As described with reference to FIGS. 8C and 8D, the imaging element 10 is reversible with respect to the incidence and reflection directions of the light ray. When the incidence and reflection directions of the imaging element 10 are reversed, the radius of the circular arc is set based on the distance between the imaging element 10 and the floating image formed at the first surface 11a side. Similarly to the description described above, the radius of the circular arc of the reflector array 20 is set to about 2 times the distance between the imaging element 10 and the floating image.

In the imaging element 10, the tangent plane that contacts the first surface 11a at the lowest position at the negative Z2-axis side is the virtual plane P0 that is parallel to the X2Y2-plane.

Figure 10:
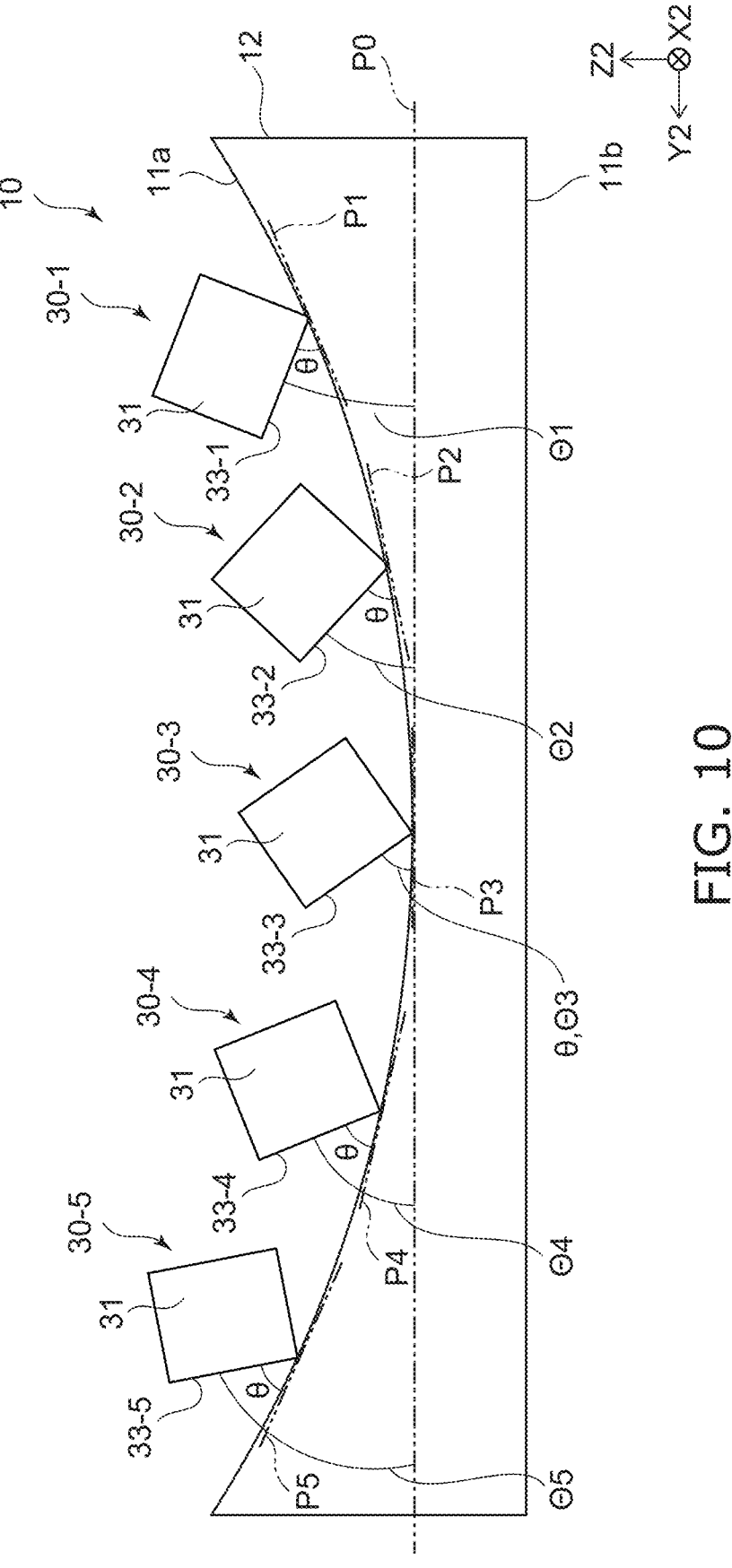
FIG. 10 is a schematic side view illustrating the imaging element of FIG. 5.

FIG. 10 is a schematic side view illustrating the imaging element of FIG. 5.

FIG. 10 shows one dihedral corner reflector included in the reflector row 22 shown in FIGS. 5 and 7. As described with reference to FIGS. 5 and 7, the multiple reflector rows 22 each extend along the X2-direction and are arranged at substantially uniform spacing in the Y2-direction. The angles of the multiple dihedral corner reflectors included in one reflector row 22 with respect to the virtual plane P0 are substantially the same. Accordingly, the angle of the dihedral corner reflector 30 with respect to the virtual plane P0 refers to the angle with respect to the virtual plane P0 of the reflector row 22 to which the dihedral corner reflector 30 belongs.

FIG. 10 is an enlarged schematic illustration of five dihedral corner reflectors 30-1 to 30-5 among the many dihedral corner reflectors arranged in the Y2-direction. Although different reference numerals are used to differentiate the positions in the Y2-axis, the configurations of the dihedral corner reflectors 30-1 to 30-5 are the same as that of the dihedral corner reflector 30 described with reference to FIGS. 8A and 8B. The base part 36 shown in FIG. 8B is not illustrated to avoid complexity of illustration in FIG. 10.

As shown in FIG. 10, the dihedral corner reflectors 30-1 to 30-5 have different angles $\Theta1$ to $\Theta5$ with respect to the virtual plane P0 according to the positions in the Y2-axis of the first surface 11a. The angles $\Theta1$ to $\Theta5$ of the dihedral corner reflectors 30-1 to 30-5 are illustrated by the angles of the valley-side connecting lines (straight lines) 33-1 to 33-5 with respect to the virtual plane P0.

In the example shown in FIG. 10, the dihedral corner reflectors 30-1 to 30-5 are arranged in this order in the positive direction of the Y2-axis. The angles $\Theta1$ to $\Theta5$ of the dihedral corner reflectors 30-1 to 30-5 are set to increase in this order. That is, the sizes of the angles $\Theta1$ to $\Theta5$ are set to $\Theta1 < \Theta2 < \Theta3 < \Theta4 < \Theta5$.

Figures 11A, 11B:
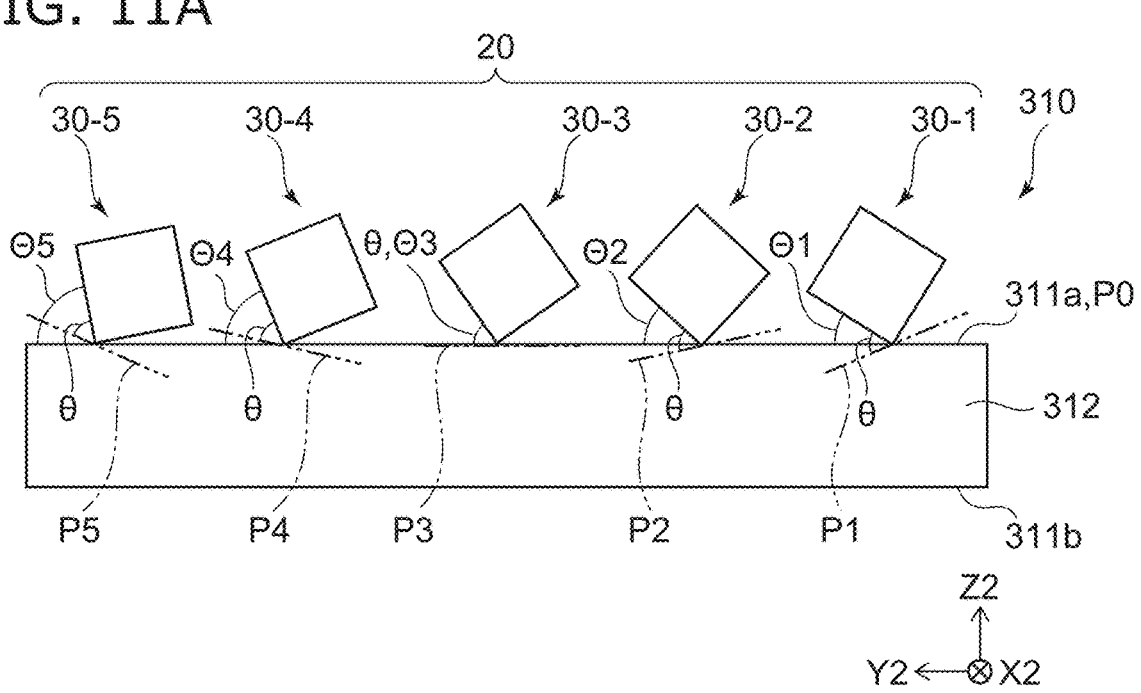
FIG. 11A is a schematic side view illustrating a portion, i.e., a modification of the imaging element, of the image display device according to the first embodiment.
FIG. 11B is a schematic side view illustrating a portion, i.e., another modification of the imaging element, of the image display device according to the first embodiment.

More generally, when referenced to the reflector row (a first reflector row) 22 of the dihedral corner reflector set to the smallest value, the angles $\Theta1$ to $\Theta5$ of the dihedral corner reflectors 30-1 to 30-5 increase away from the reflector row 22 in one direction along the Y2-axis. Also, the angles $\Theta1$ to $\Theta5$ decrease away from the reference reflector row 22 in the other direction along the Y2-axis. In the example of FIGS. 11A and 11B, when the position of the dihedral corner reflector 30-1 set to the smallest angle is used as the reference, the sizes of the angles $\Theta1$ to $5$ are $\Theta1 < \Theta2 < \Theta3 < \Theta4 < \Theta5$ in the positive direction of the Y2-axis.

The angles $\Theta1$ to $\Theta5$ of the dihedral corner reflector can be set so that $0° < \Theta1$ to $\Theta5 < 90°$. Although the angles between the first reflecting surface 31 and the virtual plane P0 are determined according to the angles $\Theta1$ to $\Theta5$, $45° <$ (the angle between the first reflecting surface 31 and the virtual plane P0)<90° can be set. The angle between the second reflecting surface 32 and the virtual plane P0 is equal to the angle between the first reflecting surface 31 and the virtual plane P0. Accordingly, 45°<(the angle between the second reflecting surface 32 and the virtual plane P0)<90° can be set.

The tilts of the dihedral corner reflectors 30-1 to 30-5 also may be set using the angles with respect to tangent planes P1 to P5 of the first surface 11a at which the dihedral corner reflectors 30-1 to 30-5 are located. The angles of the dihedral corner reflectors 30-1 to 30-5 with respect to the tangent planes P1 to P5 are set to a constant angle q regardless of the positions of the dihedral corner reflectors 30-1 to 30-5 in the Y2-axis. For example, the angle q is based on the angle between the horizontal plane and each reflecting surface of a corner cube reflector and is set to about 30°, and more specifically, 35.3°.

In the imaging element 10 of the example, when referenced to the base member 12, the angles Θ1 to Θ5 of the dihedral corner reflectors 30-1 to 30-5 are appropriately set so that the light rays incident from the light source located at the first surface 11a side are imaged at the first surface 11a side. The imaging position is at a different mid-air position from the light source. The angles of the dihedral corner reflectors with respect to the virtual plane P0 are determined by, for example, experiments, simulations, etc.

The angles of the dihedral corner reflectors with respect to the virtual plane P0 are set to increase according to the position in the Y2-axis, or are set to decrease according to the position in the Y2-axis; therefore, the first surface 11a may not be a portion of a circular arc of a perfect circle. For example, the first surface 11a may be a portion of an arc of an ellipse, or may be a portion of a polygon corresponding to the number of reflector rows. It is sufficient to be able to set the angles of the dihedral corner reflectors according to the positions of the dihedral corner reflectors in the Y2-axis; therefore, the angles of the dihedral corner reflectors may be referenced to another plane having any angle with respect to the virtual plane P0 without using the virtual plane P0 as a reference.

Modifications of the imaging element will now be described.

FIG. 11A is a schematic side view illustrating a portion, i.e., a modification of the imaging element, of the image display device according to the first embodiment.

FIG. 11B is a schematic side view illustrating a portion, i.e., another modification of the imaging element, of the image display device according to the first embodiment.

As long as the angles of the dihedral corner reflectors with respect to the virtual plane P0 can be set similarly to those of the imaging element 10 shown in FIG. 5, the reflector array 20 need not be formed on a curved surface, and may be located on one plane.

Similarly to the description with reference to FIG. 10, FIGS. 11A and 11B are enlarged schematic illustrations of the five dihedral corner reflectors 30-1 to 30-5. The five dihedral corner reflectors 30-1 to 30-5 and their tilts corresponding to their positions are shown.

As shown in FIG. 11A, an imaging element 310 of the modification includes the reflector array 20 and a base member 312. The base member 312 includes the first surface 311a and a second surface 311b. The second surface 311b is positioned at the side opposite to the first surface 311a. The first surface 311a is a plane substantially parallel to the X2Y2-plane. The first surface 311a may be the virtual plane P0. Similarly to the example shown in FIG. 10, for example, the base member 312 is formed of a light-transmitting material.

The angles of the dihedral corner reflectors 30-1 to 30-5 with respect to the virtual plane P0 are respectively Θ1 to Θ5, and the sizes of the angles Θ1 to Θ5 are Θ1<Θ2<Θ3<Θ4<Θ5. The positions in the Y2-axis of the dihedral corner reflectors 30-1 to 30-5 are the same as the positions in the Y2-axis of the dihedral corner reflectors 30-1 to 30-5 shown in FIG. 10. Accordingly, for the tangent planes P1 to P5 of the circular arc corresponding to the positions in the Y2-axis of FIG. 10, the angles between the dihedral corner reflectors 30-1 to 30-5 and the tangent planes P1 to P5 all have the same value of the angle θ.

As shown in FIG. 11B, the imaging element 310a of the modification includes the reflector array 20 and the base member 312, and further includes a protective layer 314. The configurations of the reflector array 20 and the base member 312 are the same as those of the imaging element 310 described with reference to FIG. 11A. The protective layer 314 is arranged to cover the reflector array 20 and the first surface 311a.

When the light rays are incident on the imaging element 310a via the protective layer 314, the protective layer 314 includes a material having high light transmissivity so that the transmitted amount of the light rays is substantially constant. It is favorable for a surface 313a of the protective layer 314 to be sufficiently flat so that the refraction angles of the incident light rays are substantially constant.

According to the modification, the base member 312 can be a flat plate, and so the thickness of the base member necessary to make the first surface and/or the second surface into a curved surface can be reduced; therefore, the imaging elements 310 and 310a can be thinned. The imaging element 310 shown in FIG. 11A is a member in which the reflector array 20 is formed at the first surface 311a of the base member 312, and the second surface 311b has a flat surface. Therefore, production by a press using a resin base member is favorable. Also, the production of the imaging element 310 is advantageous in that production by a roll-to-roll method is easy. The roll-to-roll method is a production technique in which a base member that is wound in a roll shape is continuously supplied to the process for patterning, processing, etc. The roll-to-roll method is generally utilized in the production of plate-shaped or film-like plastic molded products, etc.

The image display device 1000 according to the embodiment includes the imaging element 310a shown in FIG. 11B. The configuration is not limited thereto; the image display device may include any of the imaging elements 10 and 310 described above. The components of the imaging elements 10, 310, and 310a can be appropriately combined. For example, the protective layer 314 may be located at the first surface 11a side of the imaging element 10.

The operation of the imaging element, including the operation principle, will now be described. Unless otherwise noted hereinbelow, the imaging element 10 described with reference to FIGS. 5 to 10 will be described. The operations of the imaging elements 310 and 310a of the modifications can be understood similarly to the imaging element 10.

Figure 12:
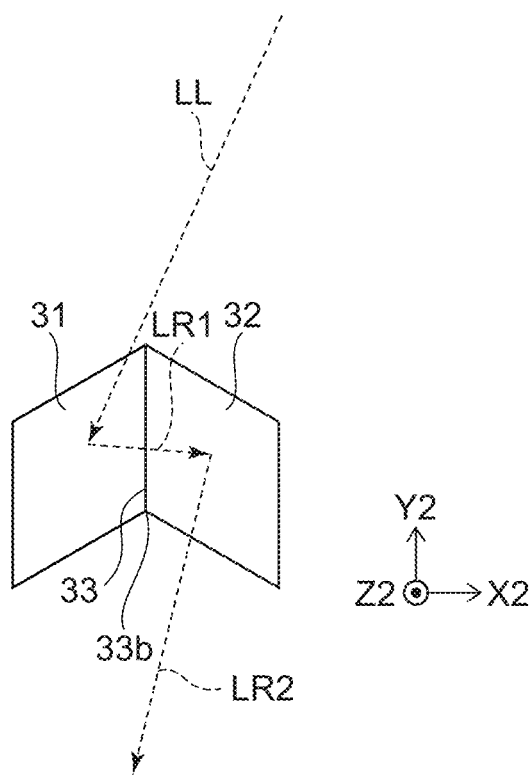
FIG. 12 is a schematic plan view for describing a portion, i.e., an operation of the imaging element, of the image display device according to the first embodiment.

FIG. 12 is a schematic plan view for describing a portion, i.e., an operation of the imaging element, of the image display device according to the first embodiment.

As shown in FIG. 12, the first reflecting surface 31 and the second reflecting surface 32 are arranged to be substantially orthogonal and connected at the valley-side connecting line 33. The vertex 33*b* is arranged to have a minimum value in the Z2-direction.

The light ray LL that is incident on the first reflecting surface 31 is reflected by the first reflecting surface 31. The once-reflected light LR1 that is reflected by the first reflecting surface 31 is reflected by the second reflecting surface 32. Unlike a corner cube reflector (e.g., Patent Literature 2), the dihedral corner reflector 30 does not include a third reflecting surface; therefore, the twice-reflected light LR2 that is reflected by the second reflecting surface 32 travels straight as-is. Here, the valley-side connecting line 33 is provided at a prescribed angle with respect to the X2Y2-plane; therefore, the twice-reflected light LR2 that is emitted from the dihedral corner reflector 30 is emitted toward the same side as the side at which the light ray LL is incident.

Figure 13:
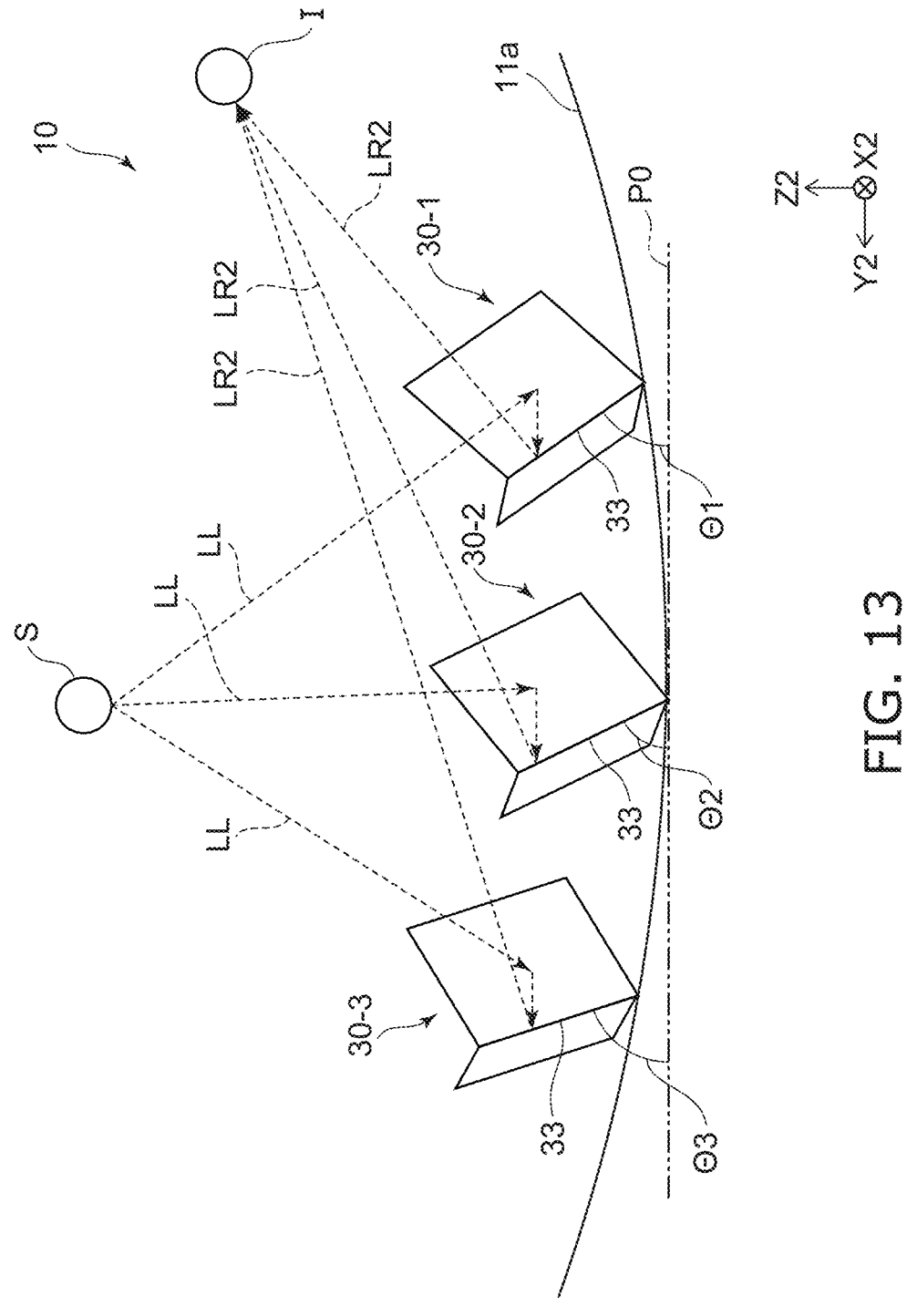
FIG. 13 is a schematic side view for describing a portion, i.e., an operation of the imaging element, of the image display device according to the first embodiment.
Figure 14:
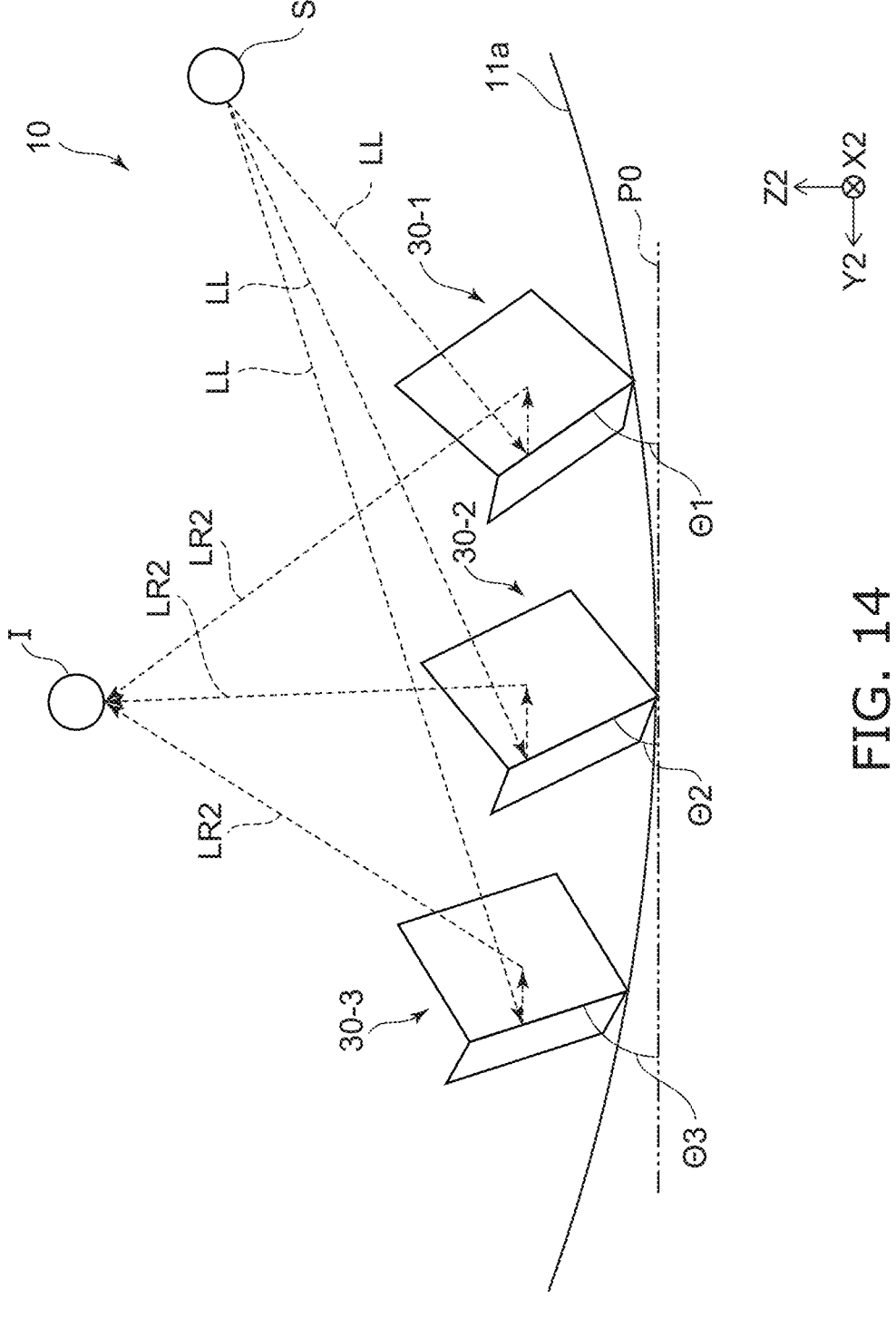
FIG. 14 is a schematic side view for describing a portion, i.e., an operation of the imaging element, of the image display device according to the first embodiment.

FIGS. 13 and 14 are schematic side views for describing a portion, i.e., an operation of the imaging element, of the image display device according to the first embodiment.

In the example of FIG. 13, a light source S is arranged in the normal direction of the virtual plane P0 at the first surface 11*a* side. In the imaging elements 310 and 310*a* of the modifications shown in FIGS. 11A and 11B, the light source is arranged in the normal direction of the first surface 311*a* at the first surface 311*a* side.

In the imaging element 10 as shown in FIG. 13, the first surface 11*a* is set to be a portion of a circular arc that is convex toward the negative Z2-axis side when projected onto the YZ-plane. The dihedral corner reflectors 30-1 to 30-3 are located on the first surface 11*a*. In the example shown in FIG. 13, the angles Θ1 to Θ3 that indicate the tilts of the dihedral corner reflectors 30-1 to 30-3 with respect to the virtual plane P0 are set to increase in the positive direction of the Y2-axis. Thus, by setting the angles Θ1 to Θ3, the twice-reflected light LR2 that is reflected twice by the dihedral corner reflector 30 forms a floating image I at the first surface 11*a* side at which the light source S is located.

The imaging element 10 operates even when the position of the light source S and the position of the floating image I are interchanged.

In FIG. 14, the configurations of the dihedral corner reflectors 30-1 to 30-3 and the relationship of the dihedral corner reflectors 30-1 to 30-3, the first surface 11*a*, and the virtual plane P0 are the same as those described with reference to FIG. 14.

As shown in FIG. 14, the light source S is located at the position of the floating image I described with reference to FIG. 13; in such a case, the floating image I is formed at the position of the light source S in FIG. 13. The light rays LL that are emitted from the light source S each are reflected twice by the dihedral corner reflectors 30-1 to 30-3, and the twice-reflected light LR2 forms a floating image at the position of the floating image I. That is, in the example shown in FIG. 14, the floating image I is formed in the normal direction of the virtual plane P0 at the first surface 11*a* side. In the case of the imaging elements 310 and 310*a* of the modifications shown in FIGS. 11A and 11B, the floating image is formed in the normal direction of the first surface 311*a* at the first surface 311*a* side.

When the light source S is at either position, the angles of the dihedral corner reflectors can be appropriately set by using experiments, simulations, etc., to form the floating image at the desired position by reflecting the light ray incident on the dihedral corner reflector twice. For example, according to the embodiment shown in FIG. 13, the light source S is set to be substantially directly above the reflector array, and according to the embodiment shown in FIG. 14, the position at which the floating image I is formed is set to be substantially directly above the reflector array. It is also possible to appropriately modify the positions of the light source S and the floating image I by appropriately adjusting the angles of the dihedral corner reflectors with respect to the virtual plane P0. When making such a design modification, ray analysis tools such as ray tracing simulation, etc., can be effectively utilized.

In the image display device 1000 according to the embodiment, the floating image is formed directly above the reflector array. In such a case as well, it is possible to interchange the position of the display device 1100(S), which is the light source, and the position at which the floating image I is formed. For the image display device 1000 of FIG. 1, it goes without saying that if the position of the display device 1100(S) and the position at which the floating image is formed are interchanged, it is necessary to modify the configurations of the housing and the light-transmitting member according to the optical path after interchanging.

Returning to FIG. 1, a series of operations of the image display device 1000 according to the embodiment is as follows. Namely, the light L that is emitted from the display device 1100(S) is incident on the imaging element 310*a*. The imaging element 310*a* sequentially reflects the incident light L by the two reflecting surfaces 31 and 32 of the dihedral corner reflector 30 of the reflector array. The imaging element 310*a* emits the reflected light R, which is the twice-reflected light of the incident light, directly above the imaging element 310*a*.

The reflected light R that is emitted from the imaging element 310*a* is emitted from the housing 1300 via the light-transmitting member 1320 provided in the housing 1300, and the floating image I1 is formed between the observer O1 and the light-transmitting member 1320. The reflected light R that is incident on the light-transmitting member 1320 and other light are attenuated by the colored portion 1321*a*. The light other than the reflected light R is substantially not emitted from the colored portion 1321*a*. The display device 1100(S) includes LED elements in the pixels, and the luminance of the light L emitted by the display device 1100(S) and the luminance of the reflected light R reflected by the imaging element 310*a* are sufficiently high. Therefore, the observer O1 can observe the floating image I1 formed with sufficient contrast even when the floating image I1 is transmitted by the colored portion 1321*a*.

Modification

Figure 15:
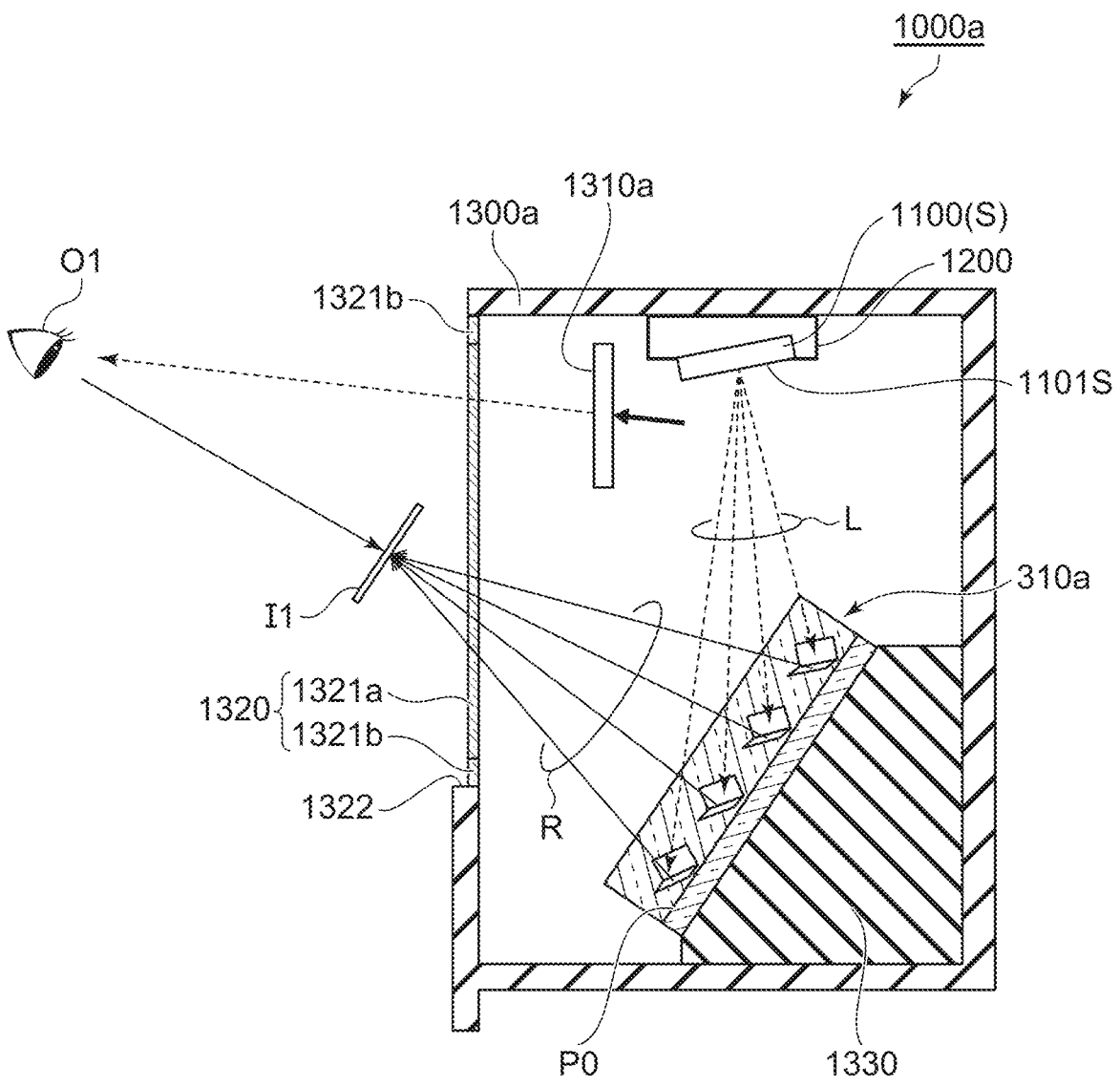
FIG. 15 is a schematic cross-sectional view illustrating an image display device according to a modification of the first embodiment.

FIG. 15 is a schematic cross-sectional view illustrating an image display device according to a modification of the first embodiment.

In the image display device 1000 shown in FIG. 1, the light-shielding member 1310 is located at the interior wall of the housing 1300, and the display device 1100(S) and the imaging element 310*a* are housed inside the housing 1300; however, the configuration is not limited thereto. The image display device 1000*a* according to the modification described below includes a light-shielding member 1310*a* that is separate from a housing 1300*a*.

As shown in FIG. 15, the image display device 1000*a* according to the modification includes the imaging element 310*a*, the display device 1100(S), the housing 1300*a*, the light-shielding member 1310*a*, and the light-transmitting member 1320. The configurations of the imaging element 310*a*, the display device 1100(S), and the light-transmitting member 1320 are the same as those of the image display device 1000 according to the first embodiment shown in FIG. 1. The same components as those of the image display device 1000 according to the first embodiment are marked with the same reference numerals, and a detailed description is omitted as appropriate.

In the image display device 1000a, the housing 1300a is located at the periphery of the display device 1100(S). The display device 1100(S) is located inside the housing 1300a via the control device 1400 located at a ceiling part inside the housing 1300a. The light-shielding member 1310a is located between the display device 1100(S) and the light-transmitting member 1320. In the example, the light-shielding member 1310a is provided separately from the housing 1300a. The light-shielding member 1310a is a plate-shaped member and is, for example, a plate including surfaces coated with a black coating material that absorbs light. The light-shielding member 1310a is arranged to shield light leaking to the periphery of the display device 1100(S).

The light-shielding member is not limited to this example and may be a circular tubular member that surrounds the entire periphery of the display device 1100(S), and has an opening provided for an emission surface 1101S of the light L of the display device 1100(S). For example, when the display device 1100(S) includes a structure body including the pixels 1112, etc., housed in a case, the display device 1100(S) itself may function as a light-shielding member by coating the interior wall of the case black or by using a case formed of a black resin.

The light-transmitting member 1320 is located in a portion of the housing 1300a. More specifically, the light-transmitting member 1320 is located at the position of the window frame 1322 formed in a portion of the housing 1300a. In the housing 1300a, by making the opening of the window frame 1322 large and by increasing the area of the light-transmitting member 1320, the image display device 1000a can display a large image in mid-air. On the other hand, by increasing the area of the light-transmitting member 1320 and the area of the opening of the window frame 1322, the leakage of the light from the display device 1100(S) located inside the housing 1300a to the outside of the housing 1300a via the light-transmitting member 1320 is considered to occur more easily. According to the modification, by providing the light-shielding member 1310a between the display device 1100(S) and the light-transmitting member 1320, the leakage of the light can be prevented from being observed by the observer O1, and a larger image can be displayed in mid-air.

Effects of the image display device 1000 according to the embodiment and the image display device 1000a according to the modification will now be described.

The image display device 1000 according to the embodiment includes the imaging element 310a. In the imaging element 310a as shown in FIG. 7, FIG. 11B, etc., the angles of the dihedral corner reflectors 30 with respect to the virtual plane P0 are set to be greater than 0° and less than 90°. Also, the angles of the dihedral corner reflectors 30 with respect to the virtual plane P0 are set to be different according to the position at which the dihedral corner reflector 30 is arranged in the Y2-axis direction, is set to increase away from the dihedral corner reflector 30 of the reference position in one direction of the Y2-axis direction, and is set to decrease away from the dihedral corner reflector 30 of the reference position in the other direction of the Y2-axis direction. By such a setting, the light ray from the first surface 311a side with respect to the base member 312 can be reflected twice, and a floating image can be formed at the first surface 311a side.

In the imaging element 310a, by appropriately setting the angles of the dihedral corner reflectors 30 with respect to the virtual plane P0, the display device 1100(S) can be located at any position at the first surface 311a side with respect to the base member 312, and the floating image I1 can be formed at the desired position directly above the reflector array.

Figure 16A:
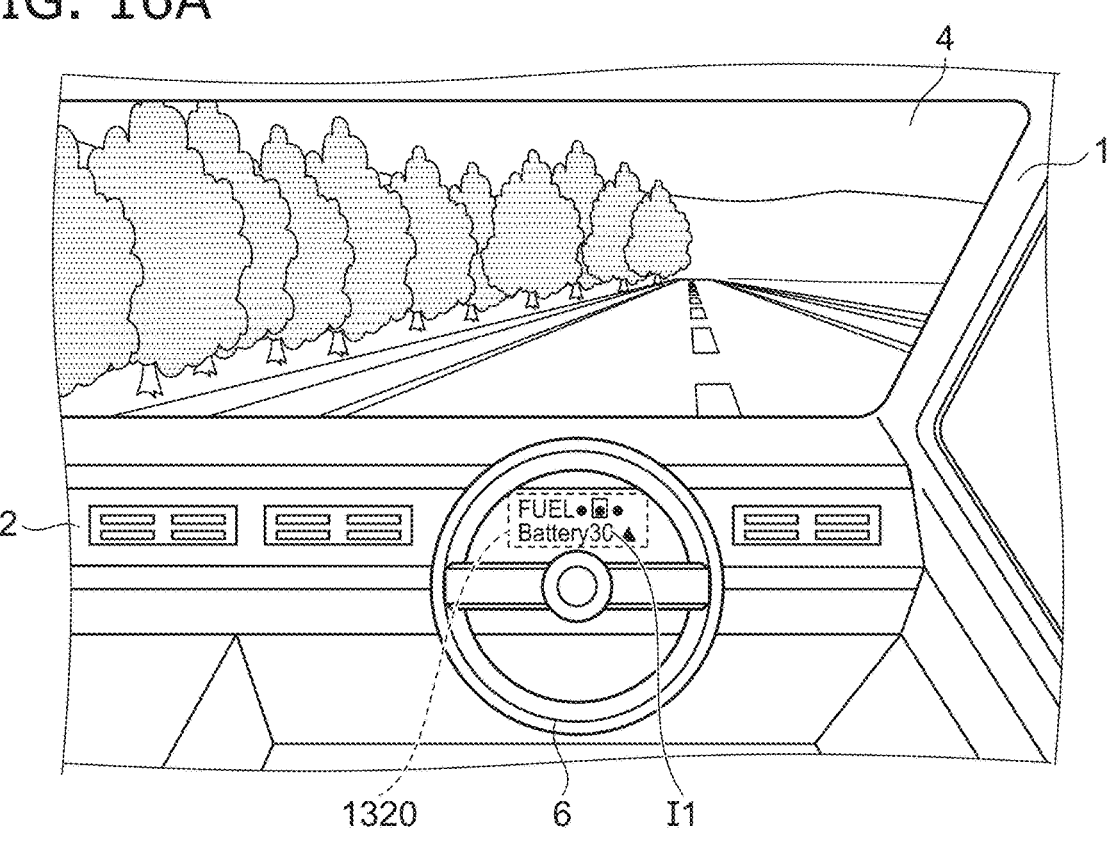
FIG. 16A is a schematic view for describing an operation of the image display device according to the first embodiment.
Figure 16B:
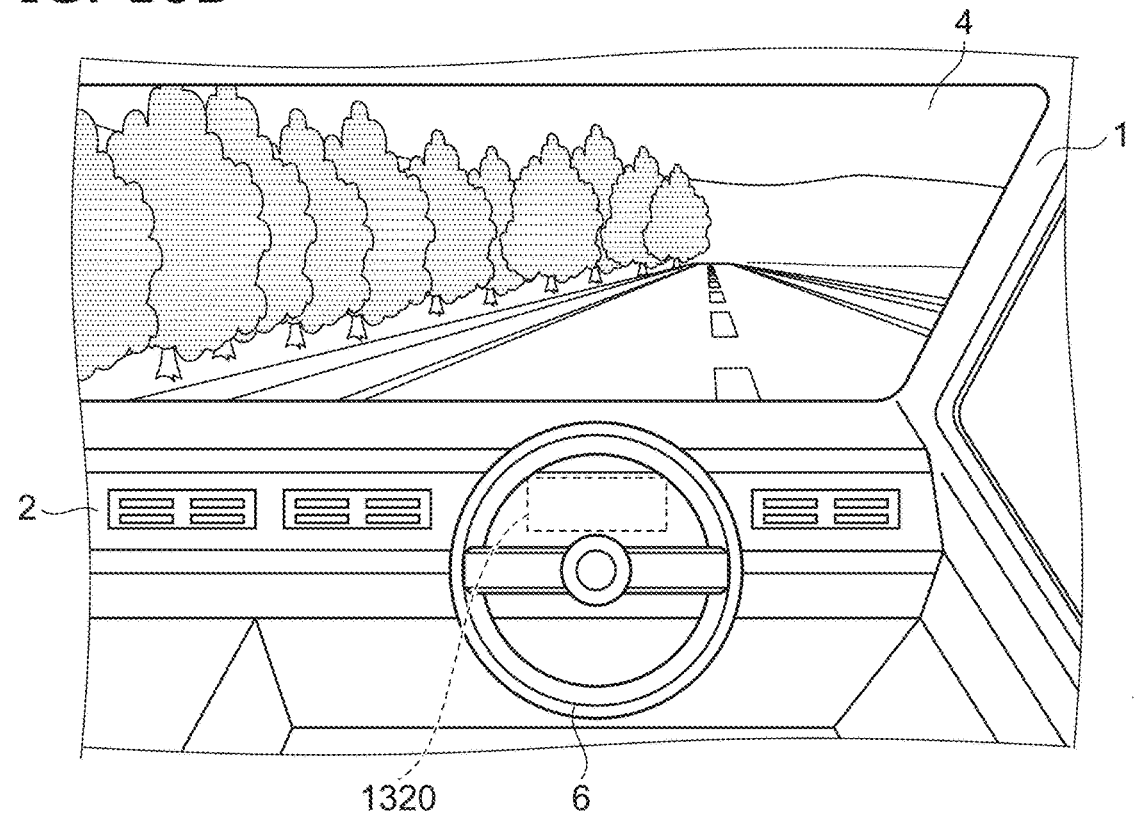
FIG. 16B is a schematic view for describing an operation of the image display device according to the first embodiment.

FIGS. 16A and 16B are schematic views for describing operations of the image display device according to the first embodiment.

The light that is emitted from the display device 1100(S) is reflected twice by the imaging element 310a to form a floating image in mid-air, and the image that is output by the display device 1100(S) is displayed in mid-air. Whether or not to display the image in mid-air is easily realized by controlling the output of the display device 1100(S). For example, the image display device 1000 is applicable to the display of an instrument panel of a vehicle.

FIGS. 16A and 16B schematically show visual information viewed by a driver seated on the driver's seat of the vehicle 1. The driver that is seated in the vehicle 1 drives the vehicle 1 while viewing the scene ahead through a front windshield 4. A dashboard 2 is located below the windshield 4, and the image display device 1000 shown in FIG. 1 is housed inside the dashboard 2. The light-transmitting member 1320 of the image display device 1000 is located in the dashboard 2 in front of the driver. In the example, the light-transmitting member 1320 has the same pattern as the dashboard 2.

As shown in FIG. 16A, information such as speed indication, fuel level, battery level, or the like is displayed in mid-air via the light-transmitting member 1320 as necessary. In the example, a steering wheel 6 is located frontward of the driver, and the floating image I1 that is displayed in mid-air can be displayed at the dashboard 2 side of the steering wheel 6 or at the driver side of the steering wheel 6.

As shown in FIG. 16B, information such as speed indication and the like may not be displayed when unnecessary. By not displaying the floating image I1 in mid-air, for example, the driver can concentrate on driving. Or, by not displaying unnecessary information, a more comfortable space can be realized in automatic driving.

The display and non-display of the floating image I1 can be switched by, for example, an operation of the driver. The operation of the driver can be, for example, a button operation or key operation by the driver, driver voice recognition, etc. The display or non-display of the floating image I1 may be switched by another trigger. For example, when the information of the floating image I1 is the speed indication, the trigger can be when the speed reaches a prescribed speed. When the information of the floating image I1 is the fuel level and/or the battery level, the trigger can be when these remaining amounts reach a prescribed value or prescribed ratio. Such displays are examples; any information display can be appropriately set based on quantitative information that can be acquired.

The image display device 1000 according to the embodiment includes the light-transmitting member 1320 including the colored portion 1321a. The colored portion 1321a controls the transmission of light of at least some wavelengths of the light emitted by the display device 1100(S). When the colored portion 1321a is black, the luminance of light of substantially all of the wavelengths is controlled to be attenuated. The control by the black colored portion 1321a suppresses the luminance of the light so that light of low luminance is not transmitted by the colored portion 1321a, and light of high luminance is transmitted by the colored portion 1321*a*. The colored portion 1321*a* transmits the light of high luminance emitted by the imaging element 310*a* and does not transmit light of low luminance emitted by reflections inside the housing 1300, etc. Therefore, internal structural components such as the imaging element 310*a*, etc., can be unnoticeable to the observer O1, and the image display device 1000 of high designability is realized.

The image display device 1000 according to the embodiment includes the display device 1100(S) including the LED element 1120. In the display device 1100(S) using the LED element 1120, the luminance of the light emitted by the LED element 1120 is greater than the luminance of light emitted by a display device using an OLED or liquid crystal. Therefore, the luminance of the light emitted by the imaging element 310*a* can be sufficiently high; the contrast of the floating image I1 can be increased, and the colored portion 1321*a* can selectively emit light that contributes to the floating image I1.

The image display device 1000 according to the embodiment includes the display device 1100(S) including the LED element 1120 in the pixel 1112. The LED element 1120 may be formed of a gallium nitride compound semiconductor, and the LED element that is formed of a gallium nitride compound semiconductor can emit light of high luminance with low power consumption. Therefore, a clear image can be displayed in mid-air even when the light emitted from the display device 1100(S) is transmitted by the colored portion 1321*a*.

Other than effects similar to the effects of the image display device 1000, the image display device 1000*a* according to the modification has the following effects. Namely, the image display device 1000*a* includes the light-shielding member 1310*a* between the display device 1100(S) and the light-transmitting member 1320. By including such a light-shielding member 1310*a*, in addition to the effects described above, the area of the light-transmitting member 1320 can be increased, and a larger image can be displayed in mid-air. It goes without saying that the configuration of the light-shielding member 1310*a* according to the modification described above is applicable to the image display devices according to the second to seventh embodiments described below, and the same effects are obtained by applying to the image display devices according to the second to seventh embodiments.

Second Embodiment

Figure 17:
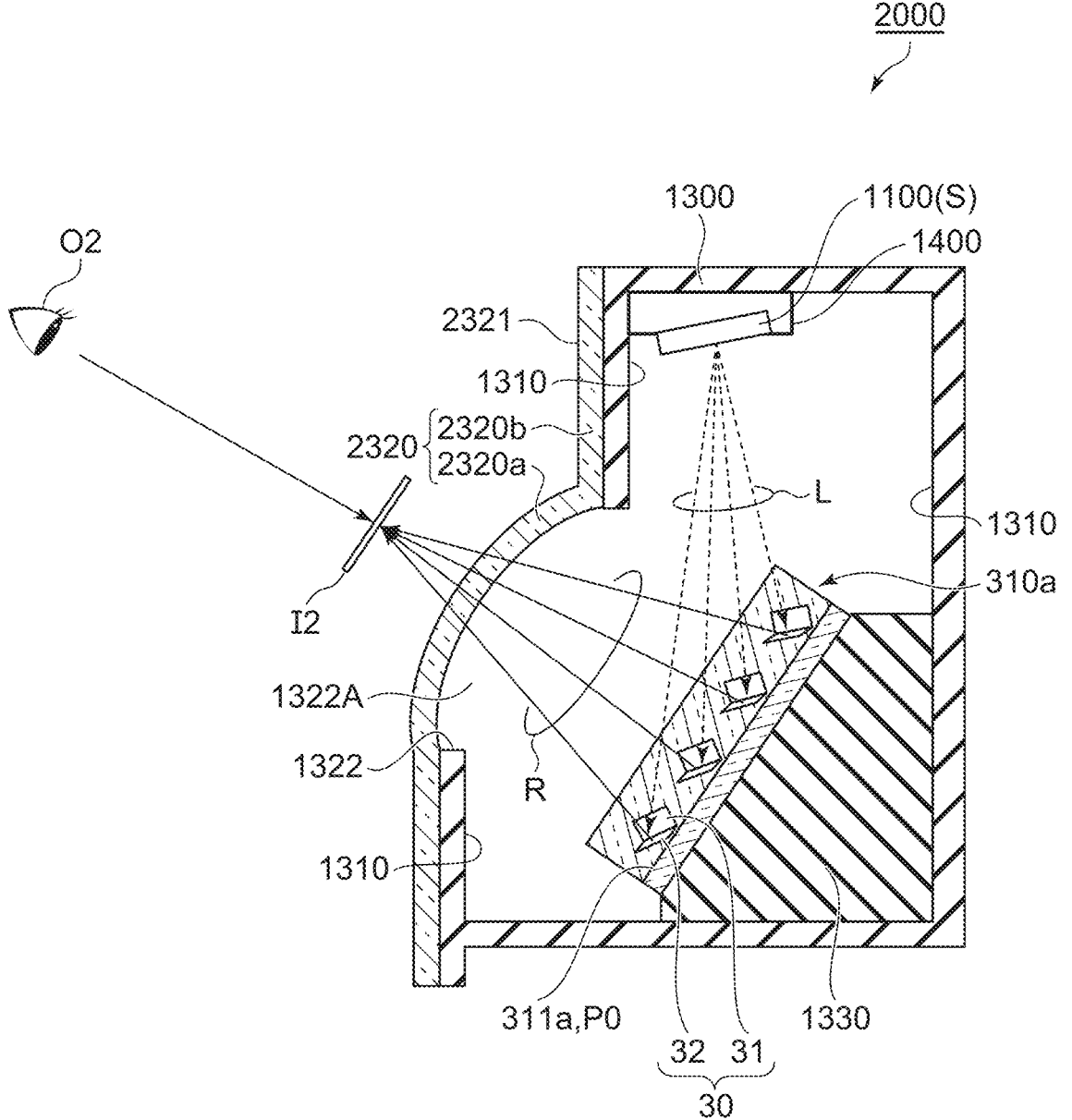
FIG. 17 is a schematic cross-sectional view illustrating an image display device according to a second embodiment.

FIG. 17 is a schematic cross-sectional view illustrating an image display device according to a second embodiment.

Figure 18:
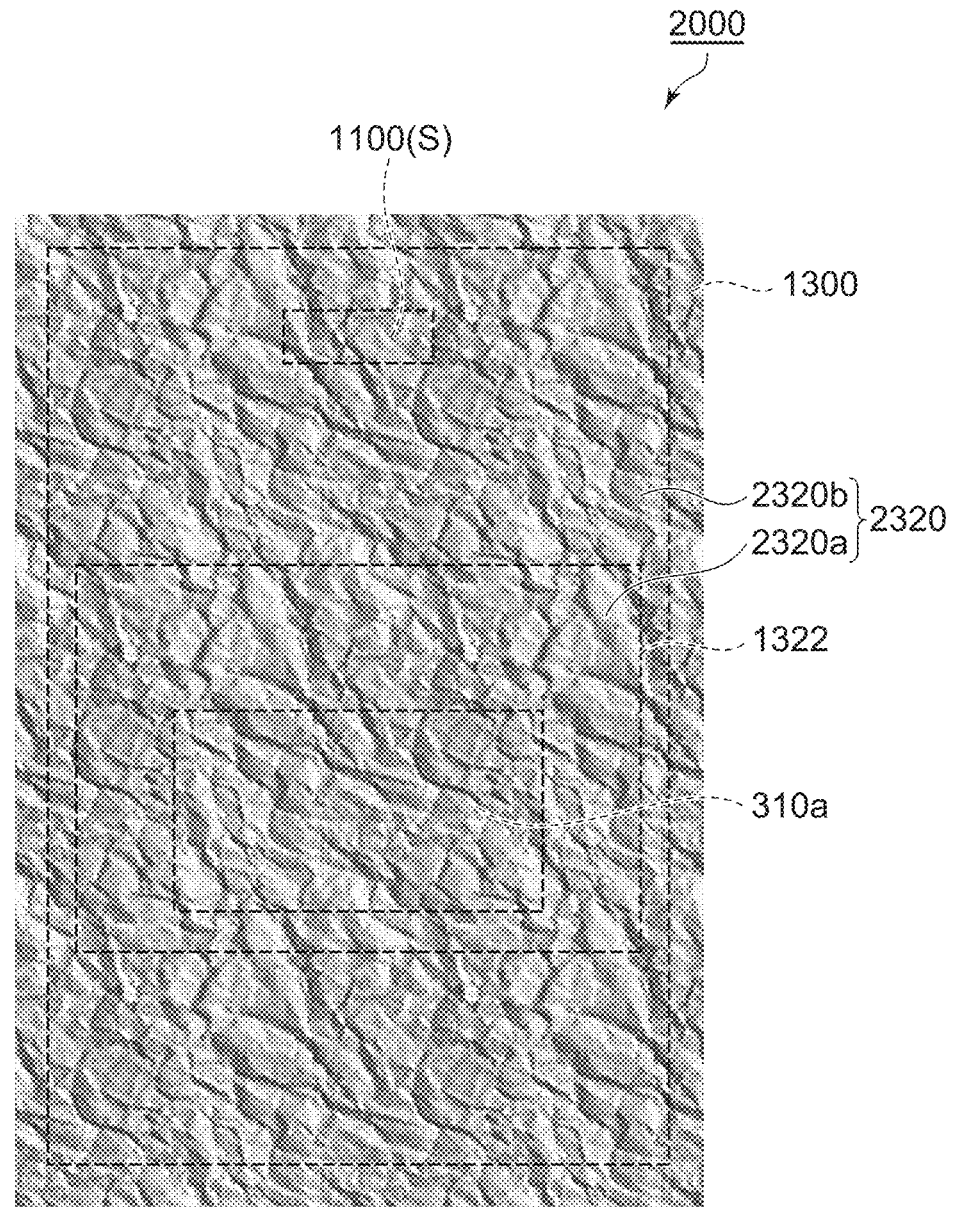
FIG. 18 is a schematic front view illustrating the image display device according to the second embodiment.

FIG. 18 is a schematic front view illustrating the image display device according to the second embodiment.

As shown in FIGS. 17 and 18, the image display device 2000 according to the embodiment includes the imaging element 310*a*, the display device 1100(S), the housing 1300, and a light-transmitting member 2320. The light-transmitting member 2320 is included instead of the light-transmitting member 1320 of the image display device 1000 according to the first embodiment. Otherwise, the components of the image display device 2000 are the same as the components of the image display device 1000 according to the first embodiment; the same components are marked with the same reference numerals, and a detailed description is omitted as appropriate.

In the image display device 2000, the light-transmitting member 2320 includes a colored portion 2321. The colored portion 2321 is provided over the entire surface of the light-transmitting member 2320. In the example shown in FIG. 17, although the colored portion 2321 is located at the outer surface of the light-transmitting member 2320, the colored portion 2321 is not limited thereto, and may be provided over the inner surface of the light-transmitting member 2320, the surface of the inner layer of the light-transmitting member 2320, and/or the entire interior.

The colored portion 2321 has a pattern that is continuous with the entire surface. The colored portion 2321 may be provided with any pattern. The pattern may look like a hard surface with a stereoscopic effect as in the example, may look like wood grain, or may be a metal-like shiny surface. Other than patterns of textured surfaces, an appropriate pattern such as a checkered pattern, plaid, etc., may be selected according to the environment in which the image display device 2000 is mounted, etc.

The colored portion 2321 controls the transmission of light by means of the shape and color of the pattern. The light that is emitted by the display device 1100(S) is incident on the colored portion 2321, and the colored portion 2321 controls the wavelength and luminance of the light. By passing light through the colored portion 2321, the pattern made in the colored portion 2321 and the like can be caused to stand out.

The light-transmitting member 2320 is located at the front of the housing 1300. Similarly to the image display device 1000 of FIG. 1, the window frame 1322 is made in the housing 1300 to face the imaging element 310*a*. The light-transmitting member 2320 also is located frontward of an opening 1322A of the window frame 1322. The light-transmitting member 2320 includes an opening portion 2320*a* frontward of the opening 1322A, and a peripheral portion 2320*b* at the periphery of the opening 1322A. A continuous pattern is made in the opening portion 2320*a* and the peripheral portion 2320*b* to be continuous over the entire surface of the light-transmitting member 2320. Therefore, an observer O2 can observe the pattern or the like made in the colored portion 2321 over the entire front of the housing 1300.

The light-transmitting member 2320 is formed of a light-transmitting material. The light-transmitting material is a light-transmitting resin, glass, etc. The pattern that is made in the entire surface of the light-transmitting member 2320 may be formed by printing on the base member surface, or a sticker in which a pattern or the like is formed may be adhered to the base member surface. Or, a random pattern may be formed by mixing a colorized resin, glass, or the like of one or more colors when forming the light-transmitting member 2320.

In the example shown in FIG. 17, the opening portion 2320*a* is a curved surface that is convex toward the outside of the housing 1300. The opening portion 2320*a* is not limited to a curved surface, and may be a plane or any surface.

The reflected light R that is emitted from the imaging element 310*a* is incident on the opening portion 2320*a* via the opening 1322A. The opening portion 2320*a* is light-transmitting and therefore transmits the reflected light R.

When the display device 1100(S) does not emit the light L, the observer O2 observes the pattern or the like made in the colored portion 2321. When the display device 1100(S) emits the light L, the observer O2 observes a floating image I2 formed by the reflected light R transmitted by the opening portion 2320*a* simultaneously with the pattern or the like made in the colored portion 2321.

Effects of the image display device 2000 according to the embodiment will now be described.

The image display device 2000 according to the embodiment has effects similar to the effects of the image display device 1000 according to the first embodiment. The following effects also are obtained. In other words, the image display device 2000 includes the light-transmitting member 2320 including the colored portion 2321 over the entire surface. A pattern or the like is made in the entire surface of the colored portion 2321, and the transmission of light by the colored portion 2321 is controlled according to the pattern or the like. Because the observer O2 observes the floating image I2 formed via the colored portion 2321, the floating image I2 is observed simultaneously with the pattern or the like of the colored portion 2321. Therefore, the observer O2 can observe the floating image I2 displayed in mid-air without noticing the existence of the housing 1300 of the image display device 2000.

The light-transmitting member 2320 need not match the shape of the front of the housing 1300, and may cover a wider area than the front of the housing 1300. Thus, the observer O2 can more naturally observe the floating image I2 floating in mid-air without noticing the existence of the image display device 2000.

The configuration of the light-transmitting member is not limited to the configuration described above as long as the observer O2 does not notice the existence of the housing 1300 and the opening 1322A. For example, a pattern that is continuous over the entirety may be formed by using the light-transmitting member to cover the opening 1322A and by providing a different member at the periphery of the light-transmitting member.

Third Embodiment

Figure 19:
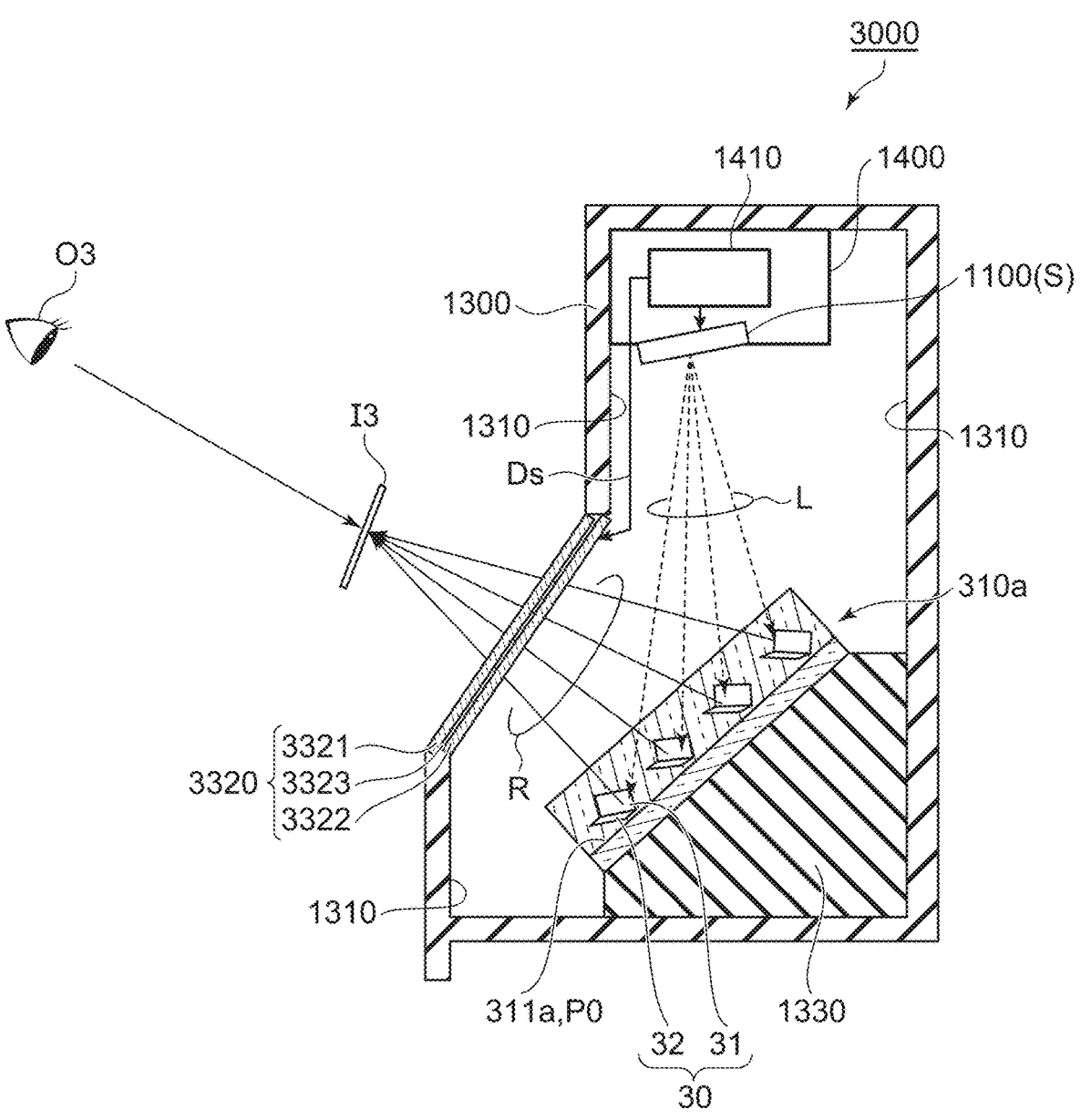
FIG. 19 is a schematic cross-sectional view illustrating an image display device according to a third embodiment.

FIG. 19 is a schematic cross-sectional view illustrating an image display device according to a third embodiment.

As shown in FIG. 19, the image display device 3000 according to the embodiment includes the imaging element 310*a*, the display device 1100(S), the housing 1300, and a light-transmitting member 3320. The image display device 3000 according to the embodiment includes the light-transmitting member 3320 instead of the light-transmitting member 1320 of the image display device 1000 according to the first embodiment. Otherwise, the components of the image display device 3000 are similar to the components of the image display device 1000 according to the first embodiment; the same components are marked with the same reference numerals, and a detailed description is omitted as appropriate.

The light-transmitting member 3320 includes a first light-transmitting member 3321, a second light-transmitting member 3322, and a liquid crystal 3323. The liquid crystal 3323 is located between the first light-transmitting member 3321 and the second light-transmitting member 3322. The first light-transmitting member 3321 includes a light-transmitting electrode and a polarizing film located on a base member. The second light-transmitting member 3322 includes a light-transmitting electrode and a polarizing film located on a base member. For example, the polarization angle of the polarizing film of the second light-transmitting member 3322 is set to be orthogonal to the polarization angle of the polarizing film of the first light-transmitting member 3321. The base members are formed of, for example, glass, etc.

The liquid crystal 3323 is located between the light-transmitting electrode at the first light-transmitting member 3321 side and the light-transmitting electrode at the second light-transmitting member 3322 side. When a voltage is not applied between the two light-transmitting electrodes, the molecular alignment of the liquid crystal 3323 has a twisted structure and transmits light from one side. When a voltage is applied between the two light-transmitting electrodes, the molecular alignment of the liquid crystal 3323 has an untwisted structure and does not transmit light from one side. That is, the light-transmitting member 3320 is a liquid crystal shutter.

The light-transmitting member 3320 operates as a liquid crystal shutter based on an open/close selection signal Ds generated by a controller 1410 included in the control device 1400. When the open/close selection signal Ds is active, the molecular alignment of the liquid crystal 3323 has an untwisted structure and shields light. When the open/close selection signal Ds is inactive, the molecular alignment of the liquid crystal 3323 has a twisted structure and transmits light. For example, the controller 1410 switches the open/close selection signal Ds between active and inactive according to the operation of an observer O3. Or, the controller 1410 may switch the open/close selection signal Ds between active and inactive according to the output of a not-illustrated proximity sensor detecting the observer O3 approaching and moving away. The controller 1410 may switch the open/close selection signal Ds between active and inactive according to any trigger signal.

In addition to generating the open/close selection signal Ds according to the prescribed trigger signal, the controller 1410 performs six-axis control of the display device 1100(S). The controller 1410 uses six-axis control to set the display device 1100(S) to have the desired position and to set the light emitted by the display device 1100(S) to have the desired angle. By the controller 1410 appropriately setting the position and angle of the display device 1100(S), for example, the angle of view of a floating image I3 when viewed by the observer O3 can be caused to match or be different from the angle of view of the light-transmitting member 3320 when viewed by the observer O3.

Effects of the image display device 3000 according to the embodiment will now be described.

The image display device 3000 according to the embodiment has effects similar to those of the image display device 1000 according to the first embodiment. The following effects also are obtained. Namely, the image display device 3000 includes the light-transmitting member 3320 that operates as a liquid crystal shutter. The display and non-display of the floating image I3 can be switched by switching the open/close selection signal Ds between active and inactive to select the opening and closing of the liquid crystal shutter. When the surface of the light-transmitting member 3320 is black, e.g., jet black, and the liquid crystal shutter is in the closed state, high designability can be realized because the observer O3 does not notice the existence of the image display device 3000.

By including the controller 1410 in the image display device 3000 according to the embodiment, the angle of view of the floating image I3 can be controlled. By controlling the angle of view of the floating image I3, the observer O3 does not easily notice the existence of the light-transmitting member 3320 even when the floating image I3 is displayed. Therefore, a design is possible in which the observer O3 does not easily notice the shape and/or structure of the housing 1300 of the image display device 3000. The control function of the angle of view of the floating image and the liquid crystal shutter function by the controller 1410 also are applicable to the image display devices 1000 and 2000 according to the first and second embodiments described above and the image display devices according to the fourth to seventh embodiments described below. It goes without saying that the control of the angle of view of the floating image by the controller 1410 has the same effects as those described above.

Fourth Embodiment

Figure 20A:
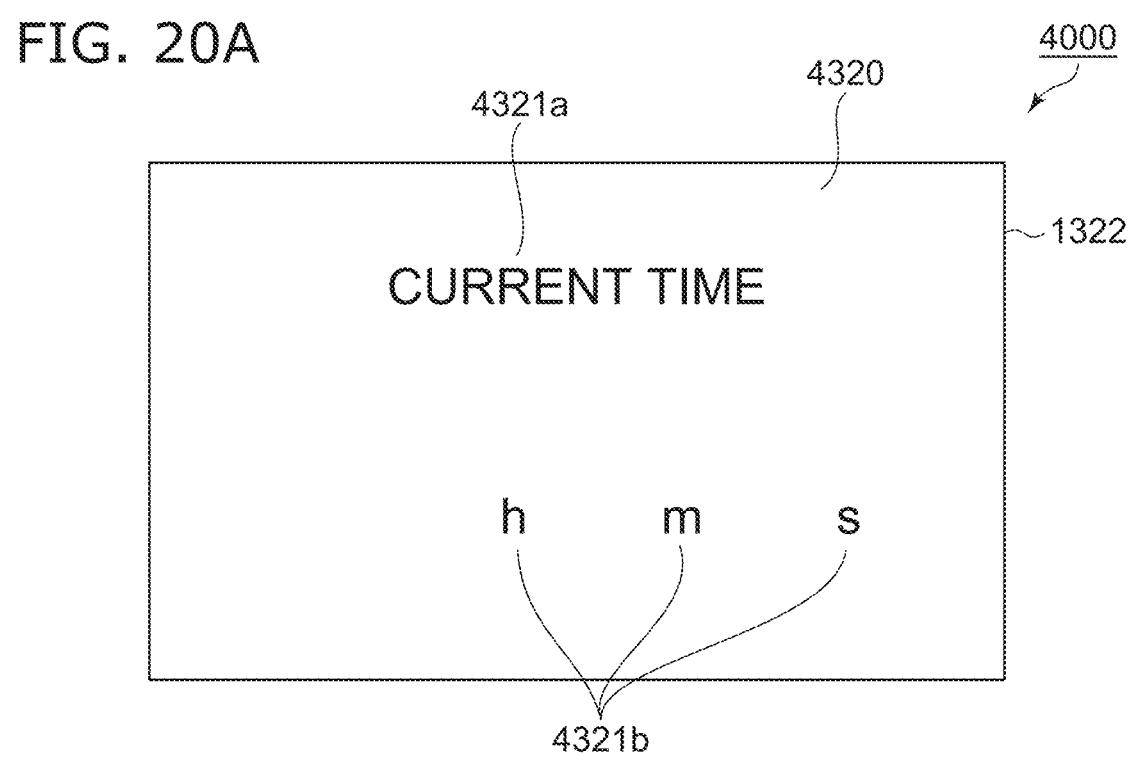
FIG. 20A is a schematic view illustrating a portion, i.e., a light-transmitting member, of an image display device according to a fourth embodiment.
Figure 20B:
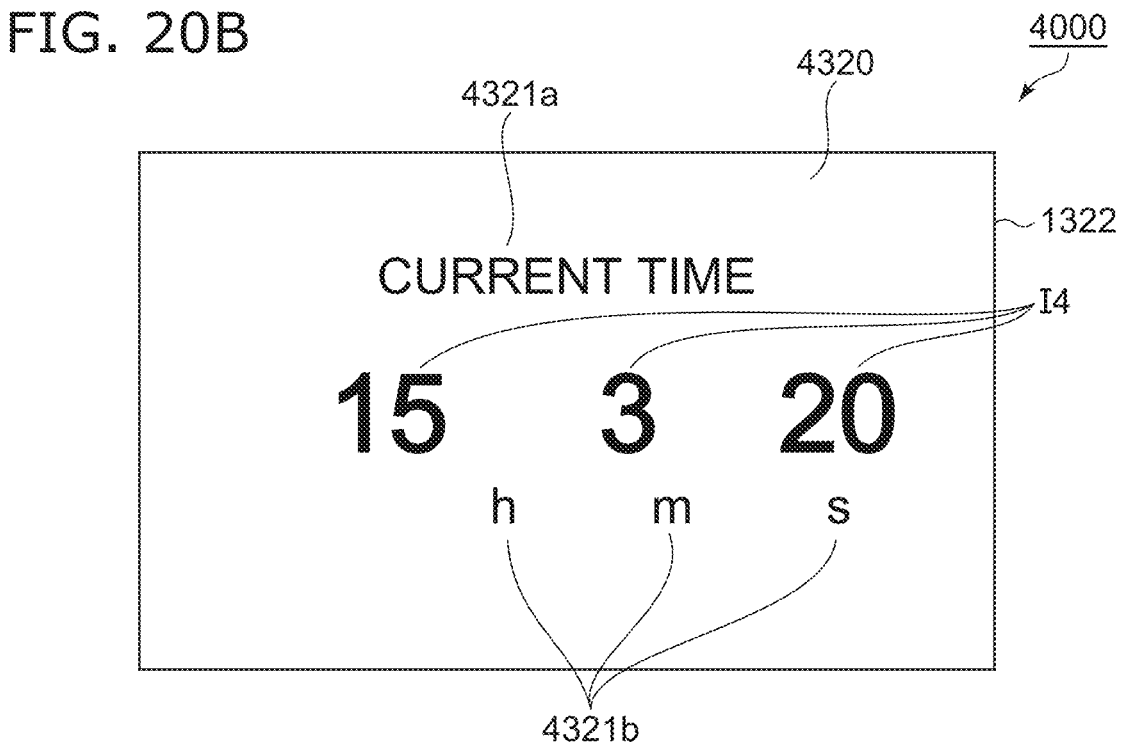
FIG. 20B is a schematic view illustrating a portion, i.e., the light-transmitting member, of the image display device according to the fourth embodiment.

FIGS. 20A and 20B are schematic views illustrating a portion, i.e., a light-transmitting member, of an image display device according to a fourth embodiment.

FIGS. 20A and 20B are enlarged illustrations of the portion of the light-transmitting member 4320 of the image display device 4000 according to the embodiment. FIG. 20A illustrates the light-transmitting member 4320 when a floating image I4 is not formed. FIG. 20B illustrates the light-transmitting member 4320 when the floating image I4 is formed.

As shown in FIGS. 20A and 20B, the light-transmitting member 4320 of the image display device 4000 includes colored portions 4321a and 4321b. The colored portions 4321a and 4321b may be characters having fine configurations of the desired colors.

FIGS. 20A and 20B show specific examples of a display by the colored portions 4321a and 4321b, and the colored portions 4321a and 4321b are words made of characters. Words that express the current time are formed by the characters of the colored portion 4321a and the display of "hour, minute, second" or "h, m, s" expressed by the colored portion 4321b and the floating image I4.

For example, the colored portions 4321a and 4321b can be formed by printing technology such as inkjet printing, etc. The colored portions 4321a and 4321b are not limited to printing; stickers in the shape of the colored portions 4321a and 4321b may be adhered. The colored portions 4321a and 4321b control and limit the transmission of the light by ink, stickers, etc.

As shown in FIG. 20B, the floating image I4 is formed in mid-air with the colored portions 4321a and 4321b of the light-transmitting member 4320 as a background. The observer observes the floating image I4 formed in mid-air together with the colored portions 4321a and 4321b. For example, similarly to the image display device 1000 shown in FIG. 1, the floating image I4 is formed in mid-air by the light L emitted from the display device 1100(S) being reflected by the imaging element 310a to emit the reflected light R.

Effects of the image display device according to the embodiment will now be described.

The image display device according to the embodiment has effects similar to those of the image display device 1000 according to the first embodiment. The image display device according to the embodiment also has the following effects. Namely, the image display device according to the embodiment includes the light-transmitting member 4320 including the colored portions 4321a and 4321b. The colored portions 4321a and 4321b are pre-formed at the surface of the light-transmitting member 4320 by printing, etc. Therefore, fine characters, symbols, shapes, etc., can be expressed on the light-transmitting member 4320 as the colored portions 4321a and 4321b.

In the image display device according to the embodiment, the floating image I4 is formed by the light emitted via the light-transmitting member 4320 on which the colored portions 4321a and 4321b are illustrated. The observer can simultaneously observe the floating image I4 and the colored portions 4321a and 4321b because the colored portions 4321a and 4321b control the transmission of the light. The floating image I4 can be changed in real time according to the image data supplied to the display device 1100(S), and the colored portions 4321a and 4321b can represent information such as fine characters, etc. Therefore, the observer can reliably recognize highly visible information in real time.

Fifth Embodiment

Figure 21:
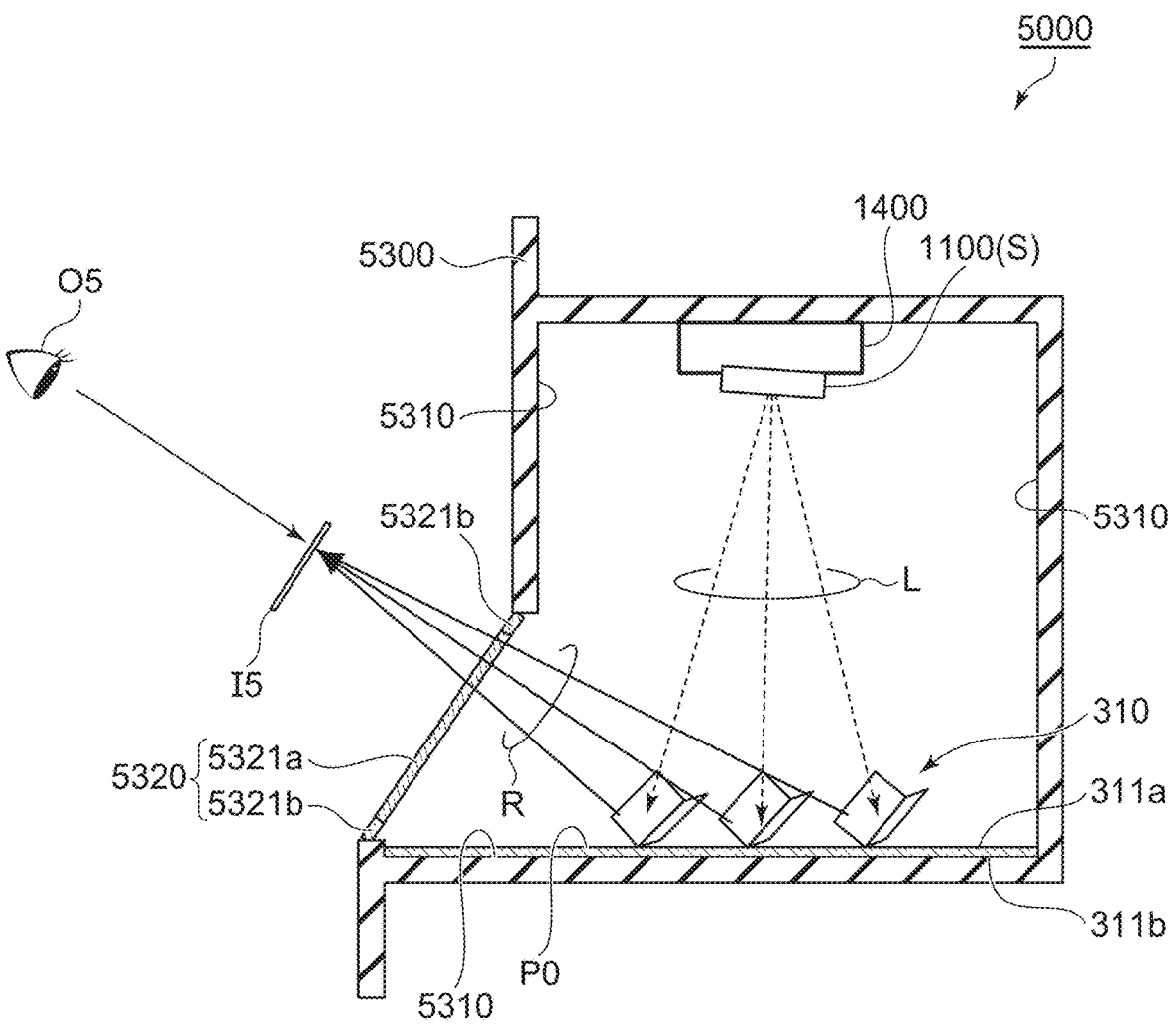
FIG. 21 is a schematic cross-sectional view illustrating an image display device according to a fifth embodiment.

FIG. 21 is a schematic cross-sectional view illustrating an image display device according to a fifth embodiment.

As shown in FIG. 21, the image display device 5000 according to the embodiment includes the imaging element 310, the display device 1100(S), a housing 5300, and a light-transmitting member 5320. The image display device 5000 according to the embodiment includes the light-transmitting member 5320 that is different from the light-transmitting member 1320 of the image display device 1000 according to the first embodiment. The relationship between the position of the display device 1100(S) and the position of the imaging element 310 of the image display device 5000 according to the embodiment is different from that of the image display device 1000 according to the first embodiment. Also, the image display device 5000 according to the embodiment includes the imaging element 310 that is different from the imaging element 310a of the image display device 1000 according to the first embodiment. The image display device 5000 according to the embodiment includes the housing 5300 that is different from the housing 1300 of the image display device 1000 according to the first embodiment. Otherwise, the components of the image display device 5000 according to the embodiment are the same as the components of the image display device 1000 according to the first embodiment; the same component are marked with the same reference numerals, and a detailed description is omitted as appropriate.

The light-transmitting member 5320 includes a colored portion 5321a. The periphery of the colored portion 5321a is surrounded with a perimeter edge portion 5321b. The colored portion 5321a is colored with a complementary color of the light emitted by the display device 1100(S). For example, when bluish white light is emitted by the display device 1100(S), the color of the colored portion 5321a is yellow. When the bluish white light emitted by the display device 1100(S) passes through the yellow colored portion 5321a, the light that is emitted via the light-transmitting member 5320 is white. An observer O5 observes a floating image I5 formed in mid-air by white light. The perimeter edge portion 5321b may be colored the same color as the colored portion 5321a, may be colored another color, or may not be colored.

Any of the configurations of the imaging elements 10, 310, and 310a is provided as the imaging element 310 according to the space inside the housing, the mounting location of the image display device, etc., as described with reference to FIGS. 11A and 11B. Although the image display device 5000 according to the embodiment includes the imaging element 310, the other imaging elements 10 and 310a may be included according to the housing, etc.

In the image display device 5000, the display device 1100(S) is located directly above the imaging element 310. The shape of the housing 5300 is set for such an arrangement. Any appropriate shape and the like of the housing may be used.

The light L that is emitted by the display device 1100(S) travels downward and is irradiated on the imaging element 310 because the display device 1100(S) is located directly above the imaging element 310. The imaging element 310 reflects a portion of the incident light twice with the dihedral corner reflector and emits the reflected light R. The light-transmitting member 5320 is positioned to transmit the reflected light R reflected twice by the imaging element 310.

The light that is reflected only once by the dihedral corner reflector of the imaging element 310 and the light that is not reflected by the dihedral corner reflector escape to the second surface 311b side through the spacing 23 between the adjacent reflector rows 22 shown in FIG. 5. Accordingly, the imaging element 310 does not emit light other than the twice-reflected light to the first surface 311a side. Therefore, in the image display device 5000 according to the embodiment, the display device 1100(S), which is the light source, is arranged in the normal direction of the first surface 311a of the imaging element 310; therefore, the spacing 23 between the adjacent reflector rows 22 is provided in the imaging element 310.

In the example, a light-shielding member 5310 is located at the bottom surface inside the housing 5300 so that the light escaping toward the second surface 311b is not re-reflected inside the housing 5300 to become stray light. The light-shielding member 5310 also is located at the sidewall surface inside the housing 5300. Similarly to the light-shielding member 1310 shown in FIG. 1, the light-shielding member 5310 is, for example, a coated film of a black coating material formed on the bottom surface and wall surface of the interior wall of the housing 5300. The light-shielding member 5310 is illustrated as an interior surface of the housing 5300 in FIG. 21 because the light-shielding member 5310 is sufficiently thin compared to the thickness of the constituent material of the housing 5300.

In the image display device 5000 according to the embodiment, the imaging element 310 emits only the twice-reflected light R of the incident light L, and does not reflect the other light toward the first surface 311a side. Therefore, as described with reference to FIG. 14, the imaging element 310 suppresses the formation of a ghost image other than the real image at the first surface 311a side.

Effects of the image display device 5000 according to the embodiment will now be described.

The image display device 5000 according to the embodiment includes a light-transmitting member including the colored portion 5321a of a complementary color of the light emitted by the display device 1100(S). Therefore, the colored portion 5321a functions as an optical filter of the light emitted by the display device 1100(S) and controls the wavelength of the emitted light. For example, when the light-transmitting member 5320 is set to blue and the floating image I5 is set to white by design, the wavelength of the light emitted by the display device 1100(S) is set to be yellowish white. By emitting the yellowish white light via the blue colored portion 5321a which is a complementary color of yellow, the wavelength of the light emitted by the display device 1100(S) is shifted, and the floating image I5 is formed of white light.

In the image display device 5000 according to the embodiment, the display device 1100(S) is located directly above the imaging element 310 in the normal direction of the first surface 311a, and the twice-reflected light of the imaging element 310 is emitted and forms a floating image at the side of the imaging element 310. Therefore, the display of a ghost image other than the real image can be prevented.

In the image display device according to the embodiment, the display device which is the light source may be arranged to form a mid-air image directly above the imaging element as in the image display device 1000 shown in FIG. 1.

The relationship between the display device 1100(S), the imaging element 310a, and the floating image formation position according to the embodiment is applicable to the image display devices 1000 to 4000 according to the first to fourth embodiments described above and the image display devices according to the sixth and seventh embodiments described below. According to the embodiment, it goes without saying that the relationship between the display device 1100(S), the imaging element 310a, and the floating image formation position according to the embodiment provides the same effects as those described above when applied to the image display devices according to the other embodiments.

Sixth Embodiment

Figure 22:
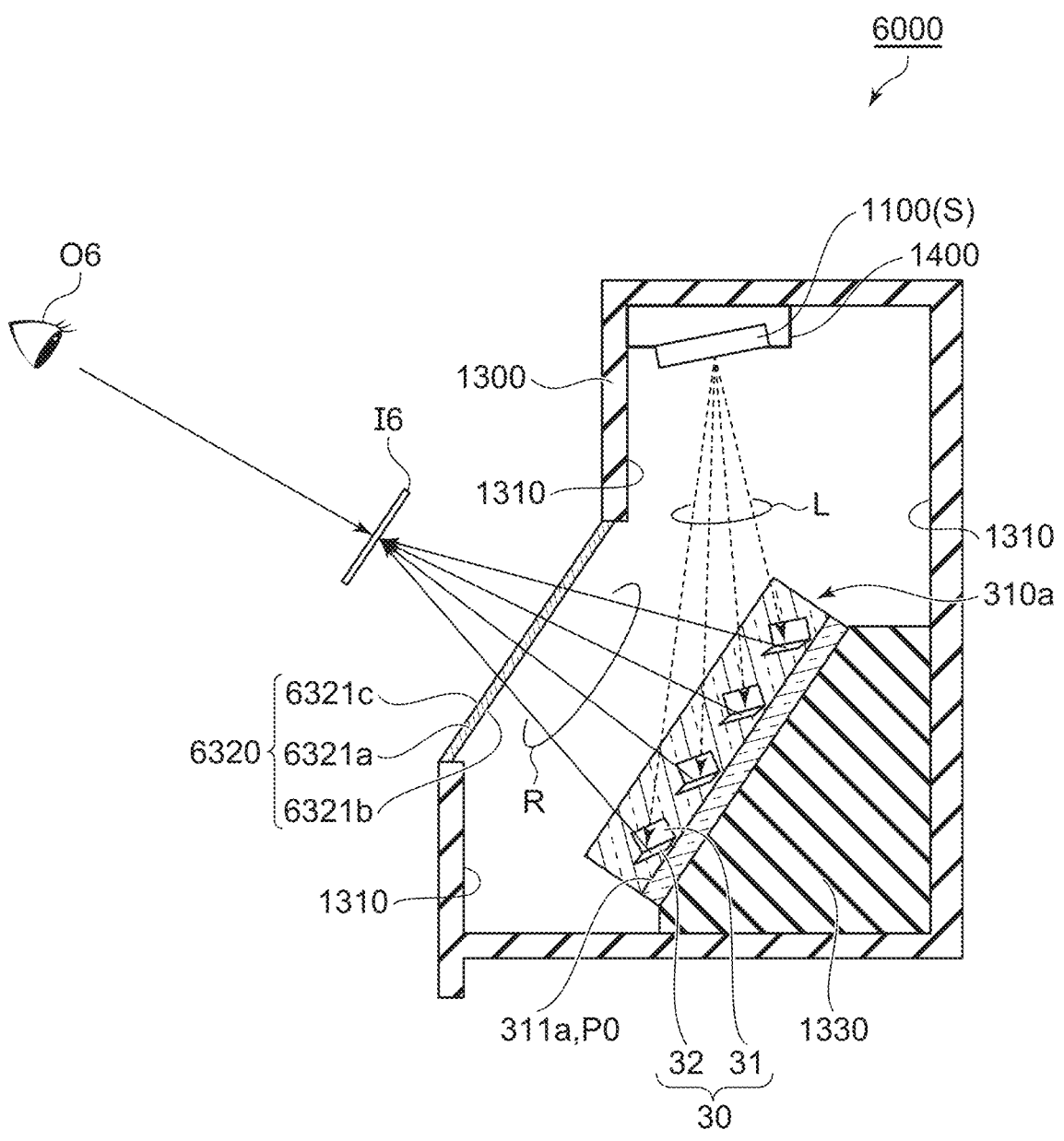
FIG. 22 is a schematic cross-sectional view illustrating an image display device according to a sixth embodiment.

FIG. 22 is a schematic cross-sectional view illustrating an image display device according to a sixth embodiment.

As shown in FIG. 22, the image display device 6000 according to the embodiment includes the imaging element 310a, the display device 1100(S), the housing 1300, and a light-transmitting member 6320. The image display device 6000 according to the embodiment includes the light-transmitting member 6320 that is different from the light-transmitting member 1320 of the image display device 1000 according to the first embodiment. Otherwise, the components of the image display device 6000 according to the embodiment are the same as the components of the image display device 1000 according to the first embodiment; the same components are marked with the same reference numerals, and a detailed description is omitted as appropriate.

The image display device 6000 according to the embodiment includes the light-transmitting member 6320 that has high light transmissivity. The haze value of the light-transmitting member 6320 is not more than 50%, and favorably not more than 10%.

The light-transmitting member 6320 includes a base member 6321a and anti-reflection members 6321b and 6321c. The base member 6321a is a plate including two surfaces. The base member 6321a is formed of a light-transmitting material. The base member 6321a is formed of a material similar to that of the light-transmitting member 1320 of the image display device 1000 according to the first embodiment. The anti-reflection member 6321b is located at one surface (the first surface) of the base member 6321a. The anti-reflection member 6321c is located at another surface (the second surface) of the base member 6321a. In the example shown in FIG. 22, the anti-reflection members 6321b and 6321c are illustrated as surfaces of the base member 6321a in FIG. 22 because the anti-reflection members 6321b and 6321c are anti-reflection coatings and are sufficiently thin compared to the thickness of the base member 6321a.

When the light-transmitting member 6320 is located in the housing 1300, the anti-reflection member 6321b is located on the base member 6321a to be at the inner side of the housing 1300. The anti-reflection member 6321b prevents the reflected light R emitted from the imaging element 310a from being re-reflected to return toward the interior of the housing 1300.

When the light-transmitting member 6320 is located in the housing 1300, the anti-reflection member 6321c is located on the base member 6321a to be at the outer side of the housing 1300. The anti-reflection member 6321c prevents the light outside the housing 1300 from being reflected by the light-transmitting member 6320.

Figure 23:
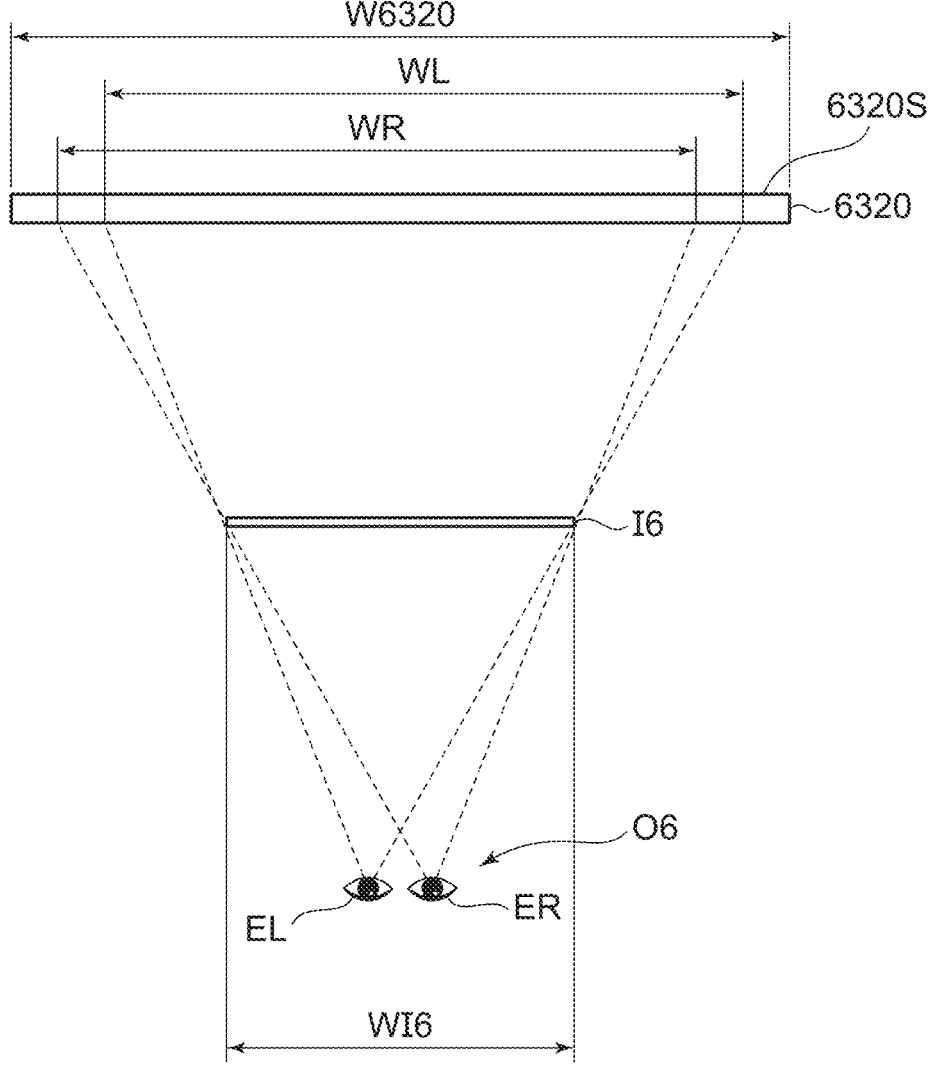
FIG. 23 is a schematic view for describing an operation of the image display device according to the sixth embodiment.

FIG. 23 is a schematic view for describing an operation of the image display device according to the sixth embodiment.

FIG. 23 shows the positional relationship of an observer O6, a floating image I6, and the light-transmitting member 6320. The observer O6 observes the floating image I6 formed in mid-air with both eyes as if the floating image I6 were projected onto a surface (an emission surface) 6320S of the light-transmitting member 6320. When a pattern or the like is made in the surface 6320S, the observer O6 observes the floating image I6 as overlapping the pattern or the like of the surface 6320S.

The floating image I6 is taken to have a width WI6 when formed in mid-air, and the light-transmitting member 6320 is taken to have a width W6320. The observer O6 observes the floating image I6 projected onto the surface 6320S of the light-transmitting member 6320 as having a projection width that corresponds to the separation distances of the observer O6, the formation position of the floating image I6, and the light-transmitting member 6320.

Here, due to the parallax of both eyes of the observer O6, the width of the floating image I6 (the width of the floating image surface) projected onto the surface (the emission surface) 6320S is greater than the width when the surface 6320S is projected and there is no parallax.

More specifically, as shown in FIG. 23, in the visual field of a left eye EL of the observer O6, the floating image I6 is projected onto the surface 6320S to have a width WL. In the visual field of a right eye ER of the observer O6, the floating image I6 is projected onto the surface 6320S to have a width WR. Although the width WL of the projection image of the floating image I6 of the left eye EL is substantially equal to the width WR of the projection image of the floating image I6 of the right eye ER, the projection images are laterally shifted. The projection images that are laterally shifted are corrected inside the brain of the observer O6 so that the observer O6 perceives one projection image. Therefore, the width of the projection image of the floating image I6 on the surface 6320S as perceived by the observer O6 is greater, by the amount of the left and right parallax, than the width of the floating image I6 projected onto the surface 6320S without left and right parallax.

In the image display device 6000 according to the embodiment, the width W6320 of the light-transmitting member 6320 is set to be greater than the width of the projection image of the surface 6320S of the floating image I6 due to the parallax of both eyes of the observer O6. Therefore, the floating image I6 is within the range of the width W6320 of the light-transmitting member 6320 when projected onto the surface 6320S.

Effects of the image display device 6000 according to the embodiment will now be described.

The image display device 6000 according to the embodiment has effects similar to the effects of the image display device 1000 according to the first embodiment. The following effects also are obtained. Namely, the light-transmitting member 6320 includes the anti-reflection member 6321b at the inner surface of the base member 6321a. Therefore, light of high luminance is emitted to form the floating image I6 because light is prevented from returning to the housing 1300 interior due to reflection by the anti-reflection member 6321b. The light-transmitting member 6320 also includes the anti-reflection member 6321c at the outer surface of the base member 6321a. Therefore, the reflection of the light outside the housing 1300 is prevented, and so the floating image I6 formed by the light emitted from the light-transmitting member 6320 is displayed in mid-air with sufficient contrast.

Although it is favorable to provide the anti-reflection member at the two surfaces of the base member 6321a, the anti-reflection member may be provided at one surface and omitted from the other surface according to the conditions of the generation of the reflected light, etc.

In the image display device 6000 according to the embodiment, the width W6320 of the light-transmitting member 6320 is set based on the parallax of the observer O6 so that the entire floating image I6 is projected onto the surface 6320S of the light-transmitting member 6320. Therefore, when the pattern or the like is made in the light-transmitting member 6320, the observer O6 can observe the entire floating image I6 overlapping the pattern or the like of the light-transmitting member 6320.

The anti-reflection member can be provided at the light-transmitting members of the image display devices 1000 to 5000 according to the first to fifth embodiments described above and the image display device according to the seventh embodiment described below. It goes without saying that the same effects as those of the image display device 6000 according to the embodiment are obtained by providing the anti-reflection member at the light-transmitting members in the image display devices 1000 to 5000 according to the first to fifth embodiments and the image display device according to the seventh embodiment.

It goes without saying that the width of the light-transmitting member can be set to a width corresponding to the parallax of both eyes of the observer observing the floating image in the image display devices 1000 to 5000 according to the first to fifth embodiments described above and the image display device according to the seventh embodiment described below, and the same effects as those of the image display device 6000 according to the embodiment can be obtained.

Seventh Embodiment

Figure 24:
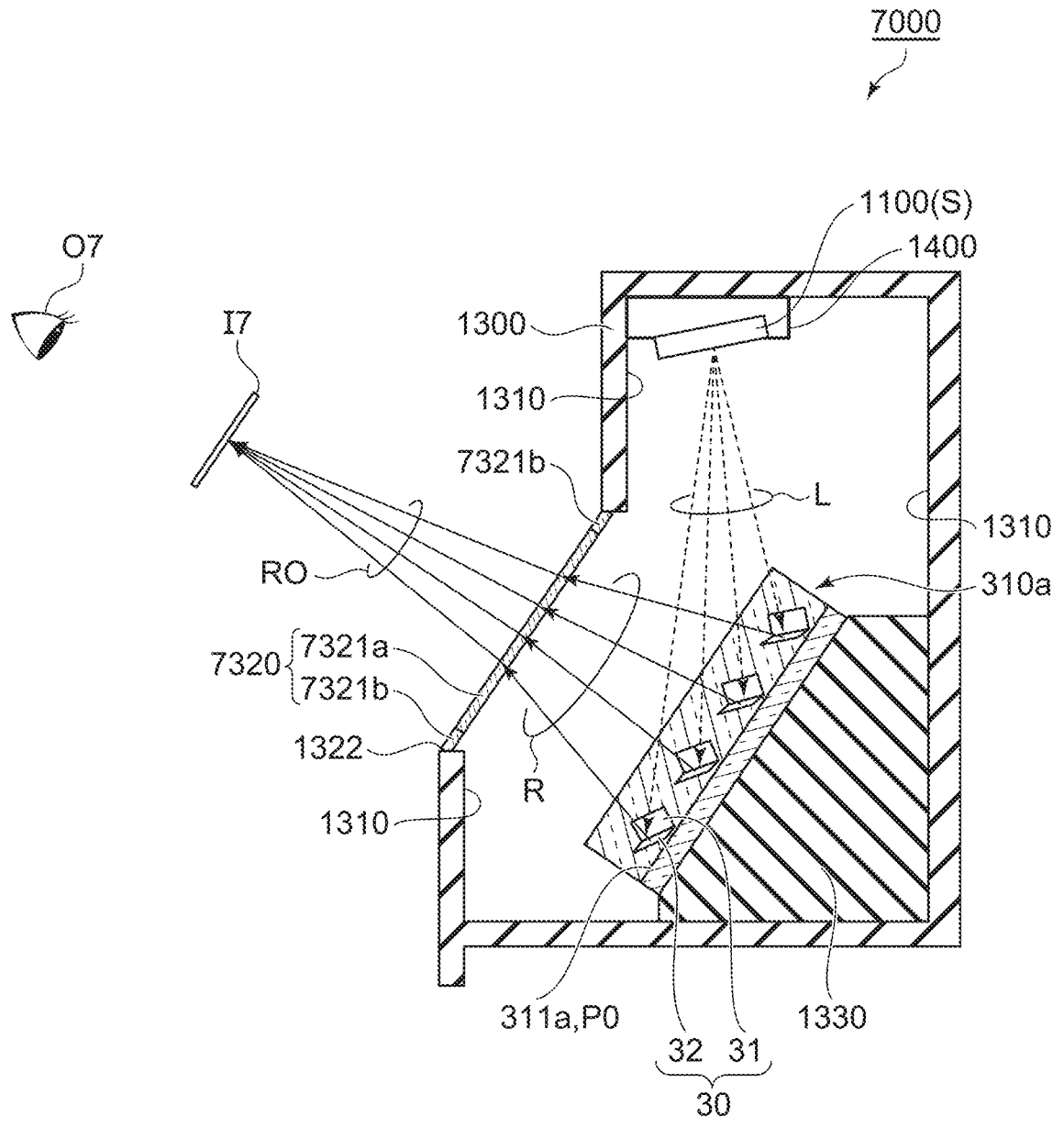
FIG. 24 is a schematic cross-sectional view illustrating an image display device according to a seventh embodiment.

FIG. 24 is a schematic cross-sectional view illustrating an image display device according to a seventh embodiment.

As shown in FIG. 24, the image display device 7000 according to the embodiment includes the imaging element 310a, the display device 1100(S), the housing 1300, and a light-transmitting member 7320. The image display device 7000 according to the embodiment includes the light-transmitting member 7320 that is different from the light-transmitting member 1320 of the image display device 1000 according to the first embodiment. Otherwise, the components of the image display device 7000 according to the embodiment are the same as the components of the image display device 1000 according to the first embodiment; the same components are marked with the same reference numerals, and a detailed description is omitted as appropriate.

The light-transmitting member 7320 includes a lens portion 7321a and a perimeter edge portion 7321b. The perimeter edge portion 7321b surrounds the periphery of the lens portion 7321a. The perimeter edge portion 7321b extends along the window frame 1322 of the housing 1300.

The lens portion 7321a is located in the optical path of the reflected light R emitted by the imaging element 310a. The lens portion 7321a modifies the position of the focal point of the reflected light R emitted from the imaging element 310a. By including the lens portion 7321a in the image display device 7000, the focal point is formed at a position more distant to the light-transmitting member 7320 than when there is no lens portion 7321a. Therefore, when viewed by an observer O7, a floating image I7 is formed at a position more proximate to the observer O7.

The lens portion 7321a may be a convex lens, a concave lens, or a Fresnel lens to appropriately and arbitrarily set the position at which the floating image I7 is formed. By using a narrow-pitch Fresnel lens as the lens portion 7321a, the light-transmitting member 7320 itself can be thinned, and blurriness of the floating image I7 can be prevented.

Effects of the image display device 7000 according to the embodiment will now be described.

The image display device 7000 according to the embodiment has effects similar to those of the image display device 1000 according to the first embodiment. The image display device 7000 according to the embodiment also has the following effects. Namely, the image display device 7000 according to the embodiment includes the light-transmitting member 7320 that includes the lens portion 7321a. The position at which the floating image I7 is formed can be adjusted by appropriately setting the lens portion 7321a. By adjusting the formation position of the floating image I7, the arrangement of the display device 1100(S) and the imaging element 310a can be optimized, and the housing 1300 in which the display device 1100(S) and the imaging element 310a are located can be smaller.

By using a narrow-pitch Fresnel lens as the lens portion 7321a, etc., appropriate optical design can be performed to downsize and/or thin the component members of the image display device 7000 and to form a clearer floating image I7.

The embodiments described above are applicable in appropriate combinations.

According to the embodiments described above, an image display device can be realized in which a simple structure can display an image in mid-air.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments herein may be made without departing from the spirit of the inventions. The accompanying claims and their equivalents are intended to cover such forms or modifications as would fall within the scope and spirit of the inventions. Also, the embodiments described above can be implemented in combination with each other.

What is claimed is:

1. An image display device comprising:
an imaging element;
a light source configured to irradiate light toward the imaging element;
a light-shielding member configured to shield a portion of light of at least the light source; and
a light-transmitting member configured to transmit light emitted from the imaging element, the light-transmitting member selectively controlling a transmission of light of at least some wavelengths of the light emitted from the imaging element; wherein:
the imaging element comprises either:
a base member, and a reflector array provided on the base member, the base member including a first surface, and a second surface positioned at a side opposite to the first surface, or
a base member comprising a reflector array, the base member including a first surface, and a second surface positioned at a side opposite to the first surface;

the reflector array comprises a plurality of reflector rows, each of the plurality of reflector rows including a plurality of dihedral corner reflectors arranged along a first direction;
each of the plurality of dihedral corner reflectors includes:
a first reflecting surface configured to reflect light from the first surface side, and
a second reflecting surface oriented orthogonal to the first reflecting surface and configured to reflect a reflected light from the first reflecting surface toward the first surface side;
in each reflector row of the plurality of reflector rows, an angle between (i) a straight line at which the first reflecting surface and the second reflecting surface meet, and (ii) a plane in which the first direction and a second direction intersecting the first direction extend, is greater than 0° and less than 90°;
an angle between the first reflecting surface and the plane greater than 45° and less than 90°;
the plurality of reflector rows include a first reflector row in which the angle between the straight line and the plane is set to a smallest value among those of the plurality of reflector rows;
the reflector rows other than the first reflector row are configured such that the angle between the straight line and the plane is set to values that increase away from the first reflector row in the second direction;
the light source is located at the first surface side;
each of the plurality of dihedral corner reflectors is configured to cause a portion of once-reflected light to travel toward the second reflecting surface, the once-reflected light being light that is emitted from the light source and reflected at the first reflecting surface; and
the light-transmitting member is configured to transmit twice-reflected light, the twice-reflected light being a portion of the once-reflected light that is reflected at the second reflecting surface.

2. The device according to claim 1, wherein:
the light-transmitting member comprises a colored portion colored black, and
the colored portion controls the transmission of the light.

3. The device according to claim 1, wherein:
the light-transmitting member comprises:
a first light-transmitting member,
a second light-transmitting member that faces the first light-transmitting member, and
a liquid crystal located between the first light-transmitting member and the second light-transmitting member, the liquid crystal controlling the transmission of the light according to an open/close selection signal.

4. The device according to claim 1, wherein:
the light-transmitting member comprises a colored portion including at least one of a character, a symbol, or a shape.

5. The device according to claim 1, wherein:
the light-transmitting member comprises a colored portion of a complementary color of the light of the light source; and
the colored portion controls the transmission of the light.

6. The device according to claim 1, wherein:
the light-shielding member is a portion of a housing located at a periphery of the light source and the imaging element; and
the light-transmitting member is another portion of the housing.

7. The device according to claim 6, wherein:

the light-transmitting member comprises a colored portion having a pattern continuous with a pattern made in a surface of the housing, and the colored portion controls the transmission of the light.

8. The device according to claim 1, further comprising:

a housing located at a periphery of the light source and the imaging element; wherein:

the light-transmitting member is located in a portion of the housing; and the light-shielding member is located between the light source and the light-transmitting member.

9. The device according to claim 8, wherein:

the light-transmitting member comprises a colored portion having a pattern continuous with a pattern made in a surface of the housing, and the colored portion controls the transmission of the light.

10. The device according to claim 1, wherein:

the light-transmitting member comprises a lens.

11. An image display device, comprising:

an imaging element;

a light source configured to irradiate light toward the imaging element;

a light-shielding member configured to shield a portion of light of at least the light source; and a light-transmitting member configured to transmit light emitted from the imaging element, the light-transmitting member selectively controlling a transmission of light of at least some wavelengths of the light emitted from the imaging element; wherein:

the imaging element comprises either:

a base member, and a reflector array provided on the base member, the base member including a first surface, and a second surface positioned at a side opposite to the first surface, or a base member comprising a reflector array provided in a base member, the base member including a first surface, and a second surface positioned at a side opposite to the first surface;

the reflector array comprises a plurality of reflector rows, each of the plurality of reflector rows comprising a plurality of dihedral corner reflectors arranged along a first direction;

the plurality of reflector rows are arranged in a second direction to be parallel to each other with a spacing therebetween, the second direction intersecting the first direction;

the plurality of dihedral corner reflectors each including:

a first reflecting surface configured to reflect light from the first surface side, and a second reflecting surface orthogonal to the first reflecting surface and configured to reflect a reflected light reflected from the first reflecting surface toward the first surface side;

in each reflector row of the plurality of reflector rows, an angle between (i) a straight line at which the first reflecting surface and the second reflecting surface meet, and (ii) a plane in which the first direction and the second direction intersect, is greater than 0° and less than 90°;

an angle between the first reflecting surface and the plane greater than 45° and less than 90°;

the plurality of reflector rows include a first reflector row in which the angle between the straight line and the plane is set to a smallest value among those of the plurality of reflector rows;

the reflector rows other than the first reflector row are configured such that the angle between the straight line and the plane is set to values that increase away from the first reflector row in one direction along the second direction;

the light source is located at the first surface side;

each of the plurality of dihedral corner reflectors is configured such that a portion of a reflected light travels toward the second reflecting surface, and another portion of the reflected light travels toward the second surface side, the reflected light being light that is emitted from the light source and reflected once at the first reflecting surface; and the light-transmitting member is configured to transmit twice-reflected light, the twice-reflected light being a portion of the reflected light that is reflected at the second reflecting surface.

12. The device according to claim 11, wherein:

the light-transmitting member comprises a colored portion colored black; and the colored portion controls the transmission of the light.

13. The device according to claim 11, wherein:

the light-transmitting member comprises:

a first light-transmitting member, a second light-transmitting member that faces the first light-transmitting member, and a liquid crystal located between the first light-transmitting member and the second light-transmitting member, the liquid crystal controlling the transmission of the light according to an open/close selection signal.

14. The device according to claim 11, wherein:

the light-transmitting member comprises a colored portion including at least one of a character, a symbol, or a shape.

15. The device according to claim 11, wherein:

the light-transmitting member comprises a colored portion of a complementary color of the light of the light source; and the colored portion controls the transmission of the light.

16. The device according to claim 11, wherein:

the light-shielding member is a portion of a housing located at a periphery of the light source and the imaging element; and the light-transmitting member is another portion of the housing.

17. The device according to claim 16, wherein:

the light-transmitting member comprises a colored portion having a pattern continuous with a pattern made in a surface of the housing; and the colored portion controls the transmission of the light.

18. The device according to claim 11, further comprising:

a housing located at a periphery of the light source and the imaging element; wherein:

the light-transmitting member is located in a portion of the housing; and the light-shielding member is located between the light source and the light-transmitting member.

19. The device according to claim 18, wherein:

the light-transmitting member comprises a colored portion having a pattern continuous with a pattern made in a surface of the housing; and the colored portion controls the transmission of the light.

20. The device according to claim 11, wherein:

the light-transmitting member comprises a lens.

21. An image display device comprising:

an imaging element;

a light source configured to irradiate light toward the imaging element;

a light-shielding member configured to shield a portion of light of at least the light source; and a light-transmitting member configured to transmit light emitted from the imaging element, the light-transmitting member having a haze value of not more than 50%; wherein:

the imaging element comprises either:

a base member, and a reflector array located on the base member, the base member including a first surface, and a second surface positioned at a side opposite to the first surface, or a base member comprising a reflector array, the base member including a first surface, and a second surface positioned at a side opposite to the first surface;

the reflector array comprises a plurality of reflector rows, each of the plurality of reflector rows comprising a plurality of dihedral corner reflectors arranged along a first direction;

each of the plurality of dihedral corner reflectors includes:

a first reflecting surface configured to reflect light from the first surface side, and a second reflecting surface oriented orthogonal to the first reflecting surface and configured to reflect a reflected light from the first reflecting surface toward the first surface side;

in each reflector row of the plurality of reflector rows, an angle between (i) a straight line at which the first reflecting surface and the second reflecting surface meet, and (ii) a plane in which the first direction and a second direction intersecting the first direction extend, is greater than 0° and less than 90°;

an angle between the first reflecting surface and the plane is greater than 45° and less than 90°;

the plurality of reflector rows include a first reflector row in which the angle between the straight line and the plane is set to a smallest value among those of the plurality of reflector rows;

the reflector rows other than the first reflector row are configured such that the angle between the straight line and the plane is set to values that increase away from the first reflector row in the second direction;

the light source is located at the first surface side;

each of the plurality of dihedral corner reflectors is configured to cause a portion of once-reflected light to travel toward the second reflecting surface, the once-reflected light being light that is emitted from the light source and reflected at the first reflecting surface; and the light-transmitting member is configured to transmit twice-reflected light, the twice-reflected light being a portion of the once-reflected light that is reflected at the second reflecting surface.

22. The device according to claim 21, wherein:

the light-transmitting member includes a base member and an anti-reflection member;

the base member is light-transmissive;

the base member includes:

a first surface, and a second surface at a side opposite to the first surface; and the anti-reflection member is located on at least one of the first surface or the second surface.

23. The device according to claim 21, wherein:

the light-transmitting member includes an emission surface at which the light of the light source is emitted from the imaging element; and a width of the emission surface is greater than a width of a floating image surface at which a floating image is formed by the light of the light source emitted from the imaging element.

24. The device according to claim 21, wherein:

the light-transmitting member comprises a base member and an anti-reflection member;

the base member is light-transmissive;

the base member includes:

a first surface, and a second surface at a side opposite to the first surface; and the anti-reflection member is located on at least one of the first surface or the second surface.

25. An image display device comprising:

an imaging element;

a light source configured to irradiate light toward the imaging element;

a light-shielding member configured to shield a portion of light of at least the light source; and a light-transmitting member configured to transmit light emitted from the imaging element, the light-transmitting member having a haze value of not more than 50%; wherein:

the imaging element comprises either:

a base member, and a reflector array provided on the base member, the base member including a first surface, and a second surface positioned at a side opposite to the first surface, or a base member comprising a reflector array provided in a base member, the base member including a first surface, and a second surface positioned at a side opposite to the first surface;

the reflector array comprises a plurality of reflector rows, each of the plurality of reflector rows comprising a plurality of dihedral corner reflectors arranged along a first direction;

the plurality of reflector rows are arranged in a second direction to be parallel to each other with a spacing therebetween, the second direction intersecting the first direction;

each of the plurality of dihedral corner reflectors includes:

a first reflecting surface configured to reflect light from the first surface side, and a second reflecting surface orthogonal to the first reflecting surface and configured to reflect a reflected light reflected from the first reflecting surface toward the first surface side;

in each reflector row of the plurality of reflector rows, an angle between (i) a straight line at which the first reflecting surface and the second reflecting surface meet, and (ii) a plane in which the first direction and the second direction intersect, is greater than 0° and less than 90°;

an angle between the first reflecting surface and the plane is greater than 45° and less than 90°;

the plurality of reflector rows include a first reflector row in which the angle between the straight line and the plane is set to a smallest value among those of the plurality of reflector rows;

the reflector rows other than the first reflector row are configured such that the angle between the straight line and the plane is set to values that increase away from the first reflector row in one direction along the second direction;

the light source is located at the first surface side;

each of the plurality of dihedral corner reflectors is configured such that a portion of reflected light travels toward the second reflecting surface, and another portion of the reflected light travels toward the second surface side, the reflected light being light that is emitted from the light source and reflected once at the first reflecting surface;

the light-transmitting member is configured to transmit twice-reflected light, the twice-reflected light being a portion of the reflected light reflected at the second reflecting surface.

26. The device according to claim 25, wherein:

the light-transmitting member includes an emission surface at which the light of the light source is emitted from the imaging element; and a width of the emission surface is greater than a width of a floating image surface at which a floating image is formed by the light of the light source emitted from the imaging element.

\* \* \* \* \*